US008024343B2

(12) United States Patent
Gallagher

(10) Patent No.: US 8,024,343 B2
(45) Date of Patent: Sep. 20, 2011

(54) IDENTIFYING UNIQUE OBJECTS IN MULTIPLE IMAGE COLLECTIONS

(75) Inventor: Andrew C. Gallagher, Brockport, NY (US)

(73) Assignee: Eastman Kodak Company, Rochester, NY (US)

(*) Notice: Subject to any disclaimer, the term of this patent is extended or adjusted under 35 U.S.C. 154(b) by 424 days.

(21) Appl. No.: 11/399,725

(22) Filed: Apr. 7, 2006

(65) Prior Publication Data

US 2007/0239683 A1    Oct. 11, 2007

(51) Int. Cl.
*G06F 7/00* (2006.01)
*G06F 17/30* (2006.01)
*G06K 9/00* (2006.01)

(52) U.S. Cl. ......... 707/737; 707/758; 707/915; 382/118

(58) Field of Classification Search ............... 707/6, 3, 707/737, 758, 915; 382/118
See application file for complete search history.

(56) References Cited

U.S. PATENT DOCUMENTS

| | | | | |
|---|---|---|---|---|
| 5,751,286 | A  * | 5/1998 | Barber et al. | 715/835 |
| 6,813,395 | B1 * | 11/2004 | Kinjo | 382/305 |
| 7,068,309 | B2 * | 6/2006 | Toyama et al. | 348/231.5 |
| 7,403,642 | B2 * | 7/2008 | Zhang et al. | 382/118 |
| 7,428,321 | B1 * | 9/2008 | Shah et al. | 382/118 |
| 2003/0059123 | A1 * | 3/2003 | Omori | 382/254 |
| 2003/0063770 | A1 | 4/2003 | Svendsen et al. | |
| 2003/0103247 | A1 * | 6/2003 | Masera et al. | 358/453 |
| 2003/0195883 | A1 * | 10/2003 | Mojsilovic et al. | 707/6 |
| 2004/0213437 | A1 * | 10/2004 | Howard et al. | 382/115 |
| 2004/0264780 | A1 * | 12/2004 | Zhang et al. | 382/224 |
| 2004/0264810 | A1 * | 12/2004 | Taugher et al. | 382/305 |
| 2005/0256866 | A1 | 11/2005 | Lu et al. | |
| 2006/0048059 | A1 | 3/2006 | Etkin | |
| 2007/0150487 | A1 * | 6/2007 | Christian et al. | 707/100 |

OTHER PUBLICATIONS

Kuchinsky, Allan, et al., "FotoFile: A Consumer Multimedia Organization and Retrieval System" May 1999 ACM CHI'99, p. 496-503.*
Apple Inc. "Apple—iLife—iPhoto" Apr. 4, 2005, Apple Inc. p. 1-2.*
Apple Inc. "Apple—iLife—iPhoto—Share Online" Apr. 4, 2005, Apple Inc. p. 1.*
Apple Inc. "Apple—iLife—iPhoto—Organize" Apr. 4, 2005, Apple Inc. p. 1-2.*
Mathes, Adam, "Folksonomies—Cooperative Classification and Communication Through Shared Metadata" Dec. 2004, www.adammathes.com <http://www.adammathes.com/academic/computer-mediated-communication/folksonomies.html>, p. 1-20.*
Yuille et al, Feature Extraction from Faces Using Deformable Templates, Int. Journal of Comp. Vis., vol. 8, Iss. 2, 1992, pp. 99-111.
Cootes et al, Constrained Active Appearance Models, 8th International Conf. on Computer Vision, vol. 1, pp. 748-754, IEEE Computer Society Press, Jul. 2001.
Bolin et al, An Automatic Facial Feature Finding System for Portrait Images, Proceedings of IS&T PICS Conference 2002.
Turk et al, Eigenfaces for Recognition, Journal of Cognitive Neuroscience, vol. 3, No. 1, 71-86, 1991.

(Continued)

*Primary Examiner* — Brent Stace
(74) *Attorney, Agent, or Firm* — Raymond L. Owens

(57) ABSTRACT

A method of identifying images containing a unique object found in at least two separate image collections of different users comprising identifying the unique object and providing features for the unique object; at least one user identifying at least two separate image collections produced by separate users that potentially have images of the unique object; and using the features to search the at least two separate collections to identify images that contain the unique object.

3 Claims, 17 Drawing Sheets

OTHER PUBLICATIONS

Wiskott, Phantom Faces for Face Analysis, Pattern Recognition 30(6):837-846 (1997).

Naaman et al, Leveraging context to resolve identify in photo albums, Proc. of the 5th ACM/IEEE Joint Conf. on Digital Libraries, Jun. 2005, pp. 178-187.

Davis et al, From Context to Content: Leveraging Context to Infer Media Metadata, MM'04, Oct. 2004, pp. 188-195.

Vartiainen, "Using metadata and context information in sharing personal content of mobile users", Master Thesis, Univ. of Helsinki, 2003.

Ghoshal et al, Hidden Markov Models for Automatic Annotation and Content-based Retrieval of Images and Video, SIGIR'05, 2005, pp. 544-551.

\* cited by examiner

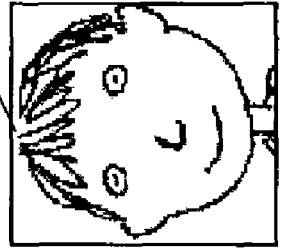
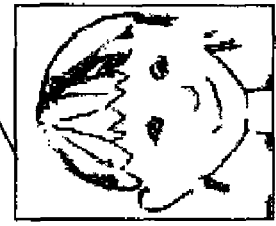
FIG. 9
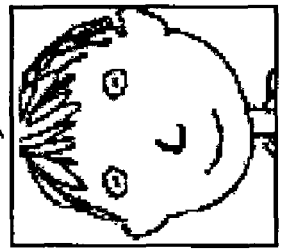
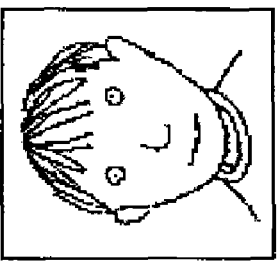
FIG. 8

IDENTIFYING UNIQUE OBJECTS IN MULTIPLE IMAGE COLLECTIONS

CROSS REFERENCE TO RELATED APPLICATION

Reference is made to commonly assigned pending U.S. patent application Ser. No. 11/399,936 filed Apr. 7, 2006, entitled "Forming Connections Between Image Collections" by Andrew C. Gallagher, the disclosure of which is incorporated herein.

FIELD OF THE INVENTION

The invention relates to identifying unique objects in multiple image collections. More specifically, the invention relates to searching for unique objects in multiple image collections using features and labels.

BACKGROUND OF THE INVENTION

With the advent of digital photography, consumers are amassing large collections of digital images and videos. The average number of images captures with digital cameras per photographer is still increasing each year. As a consequence, the organization and retrieval of images and videos is already a problem for the typical consumer. Currently, the length of time spanned by a typical consumer's digital image collection is only a few years. The organization and retrieval problem will continue to grow as the length of time spanned by the average digital image and video collection increases.

Image collection users desire to share their image collections with one another. However, it can be a difficult process for the user to manage requests from friends and relatives to view images. In U.S. Published Patent Application 2006/0048059A1, Etkin describes a system where users are a member of an online community. A user has a number of people contacts, and each person contact has an associated relationship link strength. The relationship link strength is determined in part from tags in images. For example, the tags can be names of people. This system would be sufficient when the names are complete names that uniquely identify the person of interest. However, if a tag is a first name, there are many potential matches, (e.g. in 2004 alone, over 24,000 new babies were named "Emily".) Thus, for Etkin's process to work effectively, any online community with a large membership would need to rely of tags that positively identify the individual in an image (such as full name, social security number, phone number, email address, etc.) Etkin's process does not exploit the vast amount of information contained within images and videos to determine the relationship link strength.

Furthermore, a user desires to find images and videos containing a particular unique object, such as a person of interest. The user can perform a laborious manual search to find images and videos containing particular unique objects of interest. Available commercial software (e.g. Adobe Album) permits users to tag images with labels indicating the people in the images so that searches can later be done, the initial labeling process is still very tedious and time consuming. Moreover, many users simply will not label their image collection. Although a user has invested the time to label her image collection, she can have difficulty finding relevant images from a friend's unlabeled image collection.

SUMMARY OF THE INVENTION

It is an object of the present invention to readily identify objects or persons of interests in images or videos in a digital image collection.

This object is achieved by a method of identifying images containing a unique object found in at least two separate image collections of different users, comprising:

a) identifying the unique object and providing features for the unique object;

b) at least one user identifying at least two separate image collections produced by separate users that potentially have images of the unique object; and c) using the features to search the at least two separate collections to identify images that contain the unique object.

The present invention has the advantage of permitting users to find sets of images containing individuals or objects of interest. A further advantage of the present invention is that images are automatically labeled with labels related to the individual or object of interest.

BRIEF DESCRIPTION OF THE DRAWINGS

The subject matter of the invention is described with reference to the embodiments shown in the drawings.

FIG. 8 shows an example of question posed to an image collection user to confirm whether distinct objects from two different image collections are the same object;

FIG. 9 shows a detailed view of feature extraction performed by the unique object extractor of FIG. 7;

DETAILED DESCRIPTION OF THE INVENTION

In the following description, some embodiments of the present invention will be described as software programs. Those skilled in the art will readily recognize that the equivalent of such a method can also be constructed as hardware or software within the scope of the invention.

Because image manipulation algorithms and systems are well known, the present description will be directed in particular to algorithms and systems forming part of, or cooperating more directly with, the method in accordance with the present invention. Other aspects of such algorithms and systems, and hardware or software for producing and otherwise processing the image signals involved therewith, not specifically shown or described herein can be selected from such systems, algorithms, components, and elements known in the art. Given the description as set forth in the following specification, all software implementation thereof is conventional and within the ordinary skill in such arts.

Camera users are amassing large collections of digital images and videos. The average number of images captures with digital cameras per photographer is still increasing each year. As a consequence, the organization and retrieval of images and videos is already a problem for the typical consumer. As used herein, the term "image collection" refers to a collection of a user's images and videos. For convenience, the term "image" refers to both single images and videos. Videos are a collection of images with accompanying audio and sometimes text.

The images and videos in the collection often include metadata. Metadata is image metadata is information related to the image such as image capture time, exposure time, focal length, geographic location (e.g. latitude and longitude, address, place or name) of the image capture. Metadata is not pixel or sound data. Also, the metadata can contain labels, as will be described in more detail below.

Figure 1:
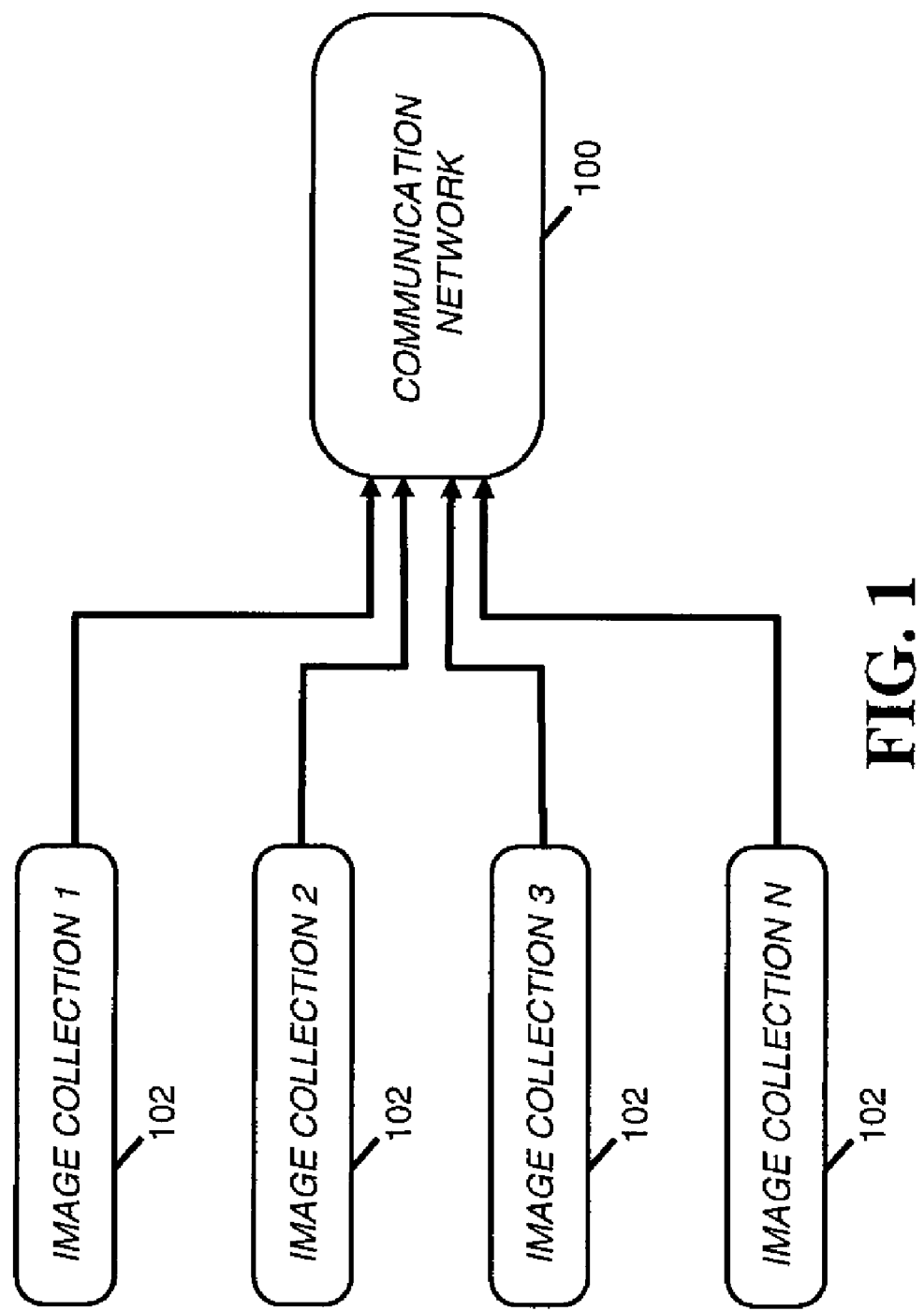
FIG. 1 is a block diagram that shows image collections that are accessible through a communication network.

A user's image collection can be stored on any of a variety of memory locations such as a personal computer (PC), a computer server, a digital camera, media such as CD-ROM or DVD media, or a variety of web hosts such as Shutterfly or Kodak EasyShare Gallery. An image collection can be distributed across a number of memory locations. For example, half of a user's images can be on a digital camera phone and the other half can be on a computer hard drive. Portions of the image collection can be stored in duplicate locations. For example a user can have all of her images on her hard drive, and 10% of these images can also be on Kodak EasyShare Gallery. As shown in FIG. 1, a set of N image collections 102 from N different users are generally accessible via a communication network 100 such as the Internet.

It is known for users to share image collections. For example, in Kodak EasyShare Gallery, a member can send an email to a friend that invites to friend to view all or a portion of the member's image collection. This sharing of images requires that a link be formed between the two users.

Each image collection can also have additional collection information about the collection as a whole. The collection information can include the name, biographical information, contact information of the user who owns the collection, ordering history, image and video display preferences, etc. The collection information can include credit card information for ordering products or services.

Figure 2:
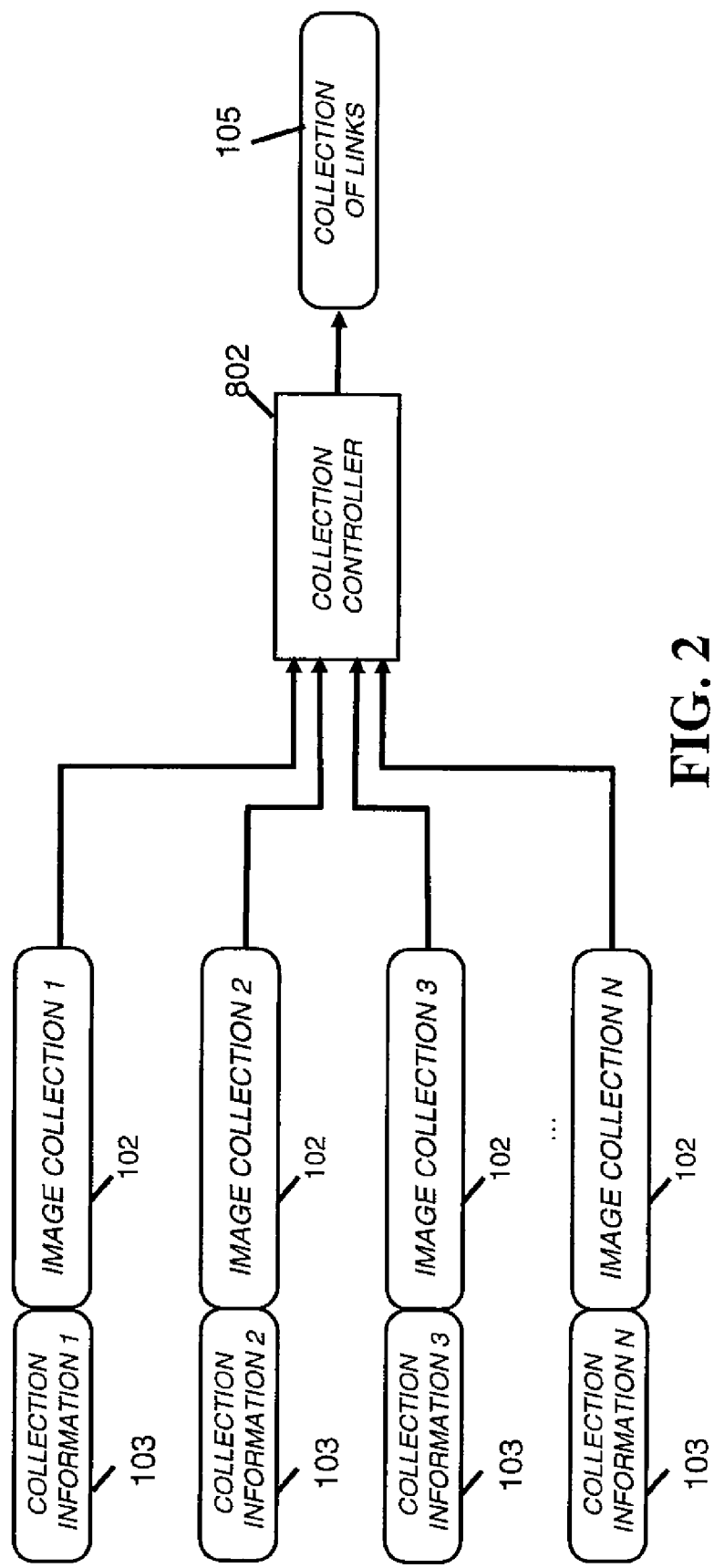
FIG. 2 is a flow chart of an embodiment of the present invention for forming links between image collections.

In FIG. 2, the collection networker 802 inputs the image collections 102 and associated collection information 103. The purpose of the collection networker 802 is to establish connections, or links, between image collections 102 that are related. To this end, the collection networker 802 produces a collection of links 105 between image collections 102. Each image collection 102 can be "linked" with 0, 1, 2, or more other image collections 102.

Links between image collections 102 facilitate sharing of images and videos in the image collection 102. It is a common desire for a user to share a portion or all of the images and videos from her image collection 102 with another user. The user (sharer) can select one or more persons with whom to share images from a list of the users of the image collections 102 linked with the user's image collection 102. Collection information 103 can be shared to others as well as the images and videos from the image collection 102. Links between image collections 102 also facilitate the task of object and person recognition, as will be described in detail below. When an image collection 102 or collection information 103 is shared to a recipient, that recipient is authorized to use the data. Thus the terms "authorized" and "shared" have similar meaning herein. Links between image collections establish a connection for sharpening images or collection data between the linked image collections 102.

The collection of links 105 are conveniently represented by a square (N×N where N is the number of image collections 102) matrix L with elemental values $l_{ij}$ (where $0<i<N+1$ and $0<j<N+1$) selected from the set $\{0,1\}$. When $l_{ij}=0$, the $i^{th}$ image collection is not linked with the $j^{th}$ image collection. When $l_{ij}=1$, the $i^{th}$ image collection is linked with the $j^{th}$ image collection. In other words, images and videos from the $i^{th}$ image collection are shared with (i.e. accessible by) the user of the $j^{th}$ image collection. Each row n of the matrix indicates the image collections that are linked with the $i^{th}$ image collection.

An example collection of links 105 is:

$$L = \begin{bmatrix} 1 & 1 & 1 & 0 \\ 1 & 1 & 0 & 1 \\ 1 & 0 & 1 & 0 \\ 0 & 1 & 0 & 1 \end{bmatrix}$$

for a case of 4 image collections. The first image collection is linked with the second and third, the second collection is linked with the first and fourth, the third collection is linked with the first, and the fourth collection is linked with the second. The diagonal matrix terms are 1 because each image collection 102 is inherently linked with itself. The matrix L can be stored in a central location (e.g. within the communication network 100 of FIG. 1, or by the EasyShare Gallery, for example.) Or, each image collection 102 can store its associated row and column of the L matrix in the associated collection information 103, (e.g. the $k^{th}$ image collection 102 can store in its associated collection information 103 the $k^{th}$ row and the $k^{th}$ column of the L matrix.) Furthermore, in a system such as EasyShare Gallery where there are a large number of image collections 102, it is preferable for each image collection 102 to store in the associated collection information 103 the identities of the image collections 102 that are linked to or by the image collection 102. This represents the same information as storing a row and a column from the L matrix, but is generally a more compact representation (i.e. uses less memory).

Preferably, the matrix L is symmetric. Practically, a symmetric L matrix means that $l_{ij}=l_{ji}$ so when the $j^{th}$ collection is linked with the $i^{th}$ collection, then the $i^{th}$ collection is also mutually linked with the $j^{th}$ collection.

Although the links between image collections 102 are described herein as either existing or not existing (i.e. binary existence), it is possible that the matrix could, for example, be composed of elements between 0 and 1.0 inclusive that indicate a link between an image collection 102 and an associated strength or probability. The magnitude of the link between two image collections 102 could indicate a variable level of privilege that one image collection user has over anothers image collection. For example, when $0<l_{ij}<0.2$, the $j^{th}$ image collection user can access low resolution (e.g. 640×480 pixel) versions of the $i^{th}$ image collection. At higher values of $l_{ij}$, the $j^{th}$ image collection user can access higher resolution versions of the $i^{th}$ image collection.

The collection networker 802 uses any of a number of processes to establish the collection of links 105. These processes work in conjunction with sharing rules, stored in the respective collection informations 103. Sharing rules ease the process of forming links between image collections and can also be used by image collection users to protect privacy (i.e. preventing unauthorized parties from accessing the image collection 102).

Figure 3:
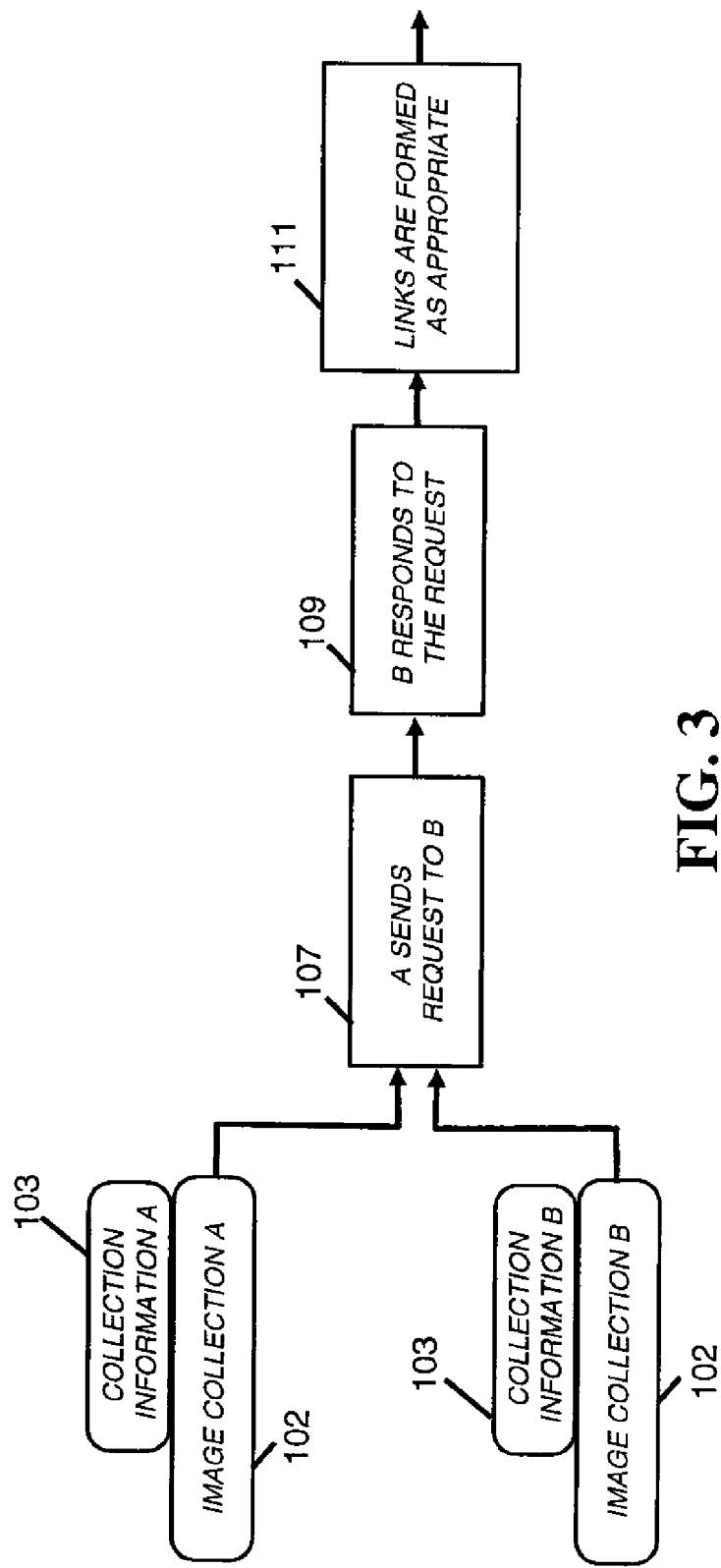
FIG. 3 shows a more detailed view of the collection networker from FIG. 2.

A first method for establishing a link between two image collections 102 is shown in FIG. 3. In step 107, an image collection user A sends a request to image collection user B. In step 109, image collection user B responds to the request. In step 111, the appropriate links between image collections 102 A and B are formed, based on the response from step 109.

The request in step 107 can take any of a number of forms. For example, the request can be:

"I (collection user A) will share my image collection with you (collection user B) but only if you share your image collection with me."

"I (collection user A) will share my image collection with you."

"I (collection user A) request that you (collection user B) share your image collection with me."

The request can be communicated to the user of image collection B through any way known in the art. For example, the request can be sent via email, via the internet, to a cellular phone, to a camera, through the U.S. Postal Service, etc.

In step 109, B can manually respond by reading or listening to the request and then accepting or declining the request. The response can be generated automatically based on sharing rules that are part of the collection information 103. For example, B can have any of the following sharing rules:

Decline all sharing requests.

Accept all sharing requests.

Accept all requests of those willing to share with me.

Accept all requests from the following list of people (Jim, Tom, Jenny, anyone with the surname Gallagher)

When the sharing rules do not specifically apply to a specific request, then the image collection user (B) can decide the response.

In step 111, the appropriate links are formed based on the request from step 107, and the response from step 109. For example, when the request is:

"I (collection user A) will share my image collection with you (collection user B) if you share your image collection with me," and the response from collection user B is to accept the request, then the terms $l_{ab}$ and $l_{ba}$ of the matrix L are set to 1.

Those skilled in the art will recognize that the request and response steps 107 and 109 can use various words, phrases, or steps to accomplish the same goal. Also, as described the request and response steps involve only two collection users for convenience. Requests can be generated that involve any number of collection users. For example:

"I (collection user A) will share my image collection with you (collection users B and C) if you (both collection users B and C) share your image collections with me and with each other."

Figure 4:
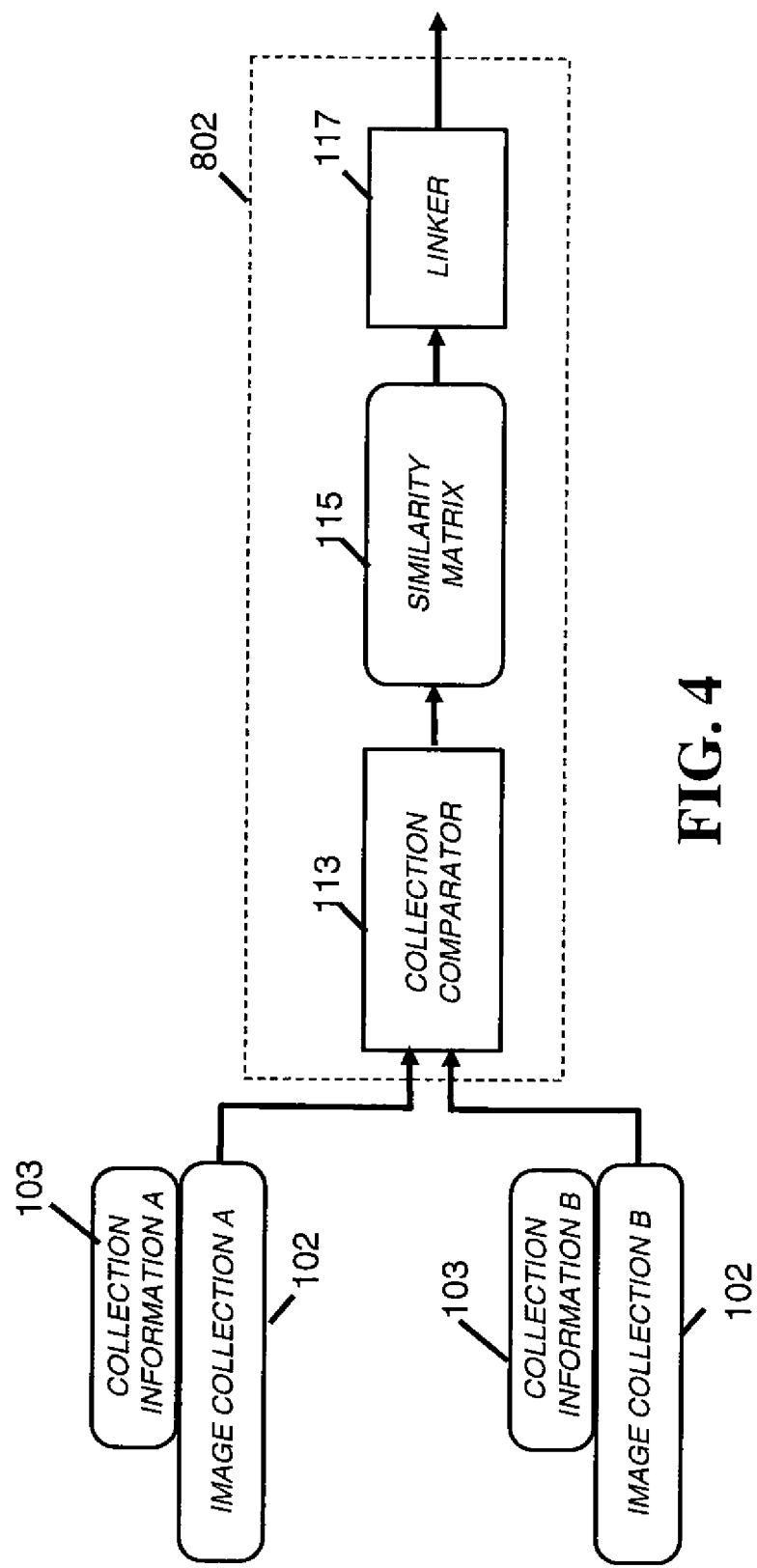
FIG. 4 shows another embodiment of the collection networker from FIG. 2.

FIG. 4 shows another embodiment of the collection networker 802. In this embodiment, the images and videos of image collections 102, along with the collection information 103 are examined to establish links between image collections 102. The collection networker 802 analyzes images and videos from the image collections 102, along with the collection information 103 associated with the image collections 102 to produce a similarity score that is used to link image collections 102. The collection comparator 113 compares pairs of image collections 102 and associated collection information 103 and produces a similarity score matrix 115 that indicates the similarity of content between the two image collections. The similarity score matrix S is an N×N matrix (where N is the number of image collections 102) $s_{ij}$ (where i and j are integers 0<i<N+1 and 0<j<N+1) preferably ranging from [0,1] inclusive. The elements $s_{ij}$ of the matrix S indicate the likelihood that the $i^{th}$ and $j^{th}$ image collection users would be interested in sharing their image collections with each other. The collection comparator 113 will be described in greater detail below.

The similarity matrix 115 is passed to the linker 117. The linker 117 examines the similarity scores in the similarity matrix. When an element $s_{ij}$ exceeds a threshold $T_0$, (indicating that there is good likelihood that the $i^{th}$ and $j^{th}$ image collection users would be interested in sharing their image collections with each other) one of several actions is taken. In the preferred embodiment, a request is sent to the user of collection i that says:

"Would you like your image collection to be linked with (the user of collection j)?" and a similar request is sent to the user of collection j. If both users accept the request, then a link is established between the collections (i.e. $l_{ij}=l_{ji}=1$.) As described hereinabove, sharing rules stored in the collection information 103 can be used to provide an automatic response to a request, or the response to the request can be determined manually by the image collection owner. Whether the response to the request is manually or automatically sent, the response essentially allows the user to identify two image collections 102 that potentially contain similar content or similar unique objects. When one user sends a request (either manually or automatically) to another user, and that user responds to the request (either manually or automatically) then the two users have collaborated to identify two image collections 102 that potentially contain similar content or similar unique objects.

In another embodiment, the linker 117 automatically establishes a link between image collections i and j when $s_{ij}$ exceeds $T_0$. Preferably $T_0=0.975$.

In summary, the linker 117 performs the steps of requesting a link between image collections, allowing a response to the request, and then forming the appropriate links.

Figure 5:
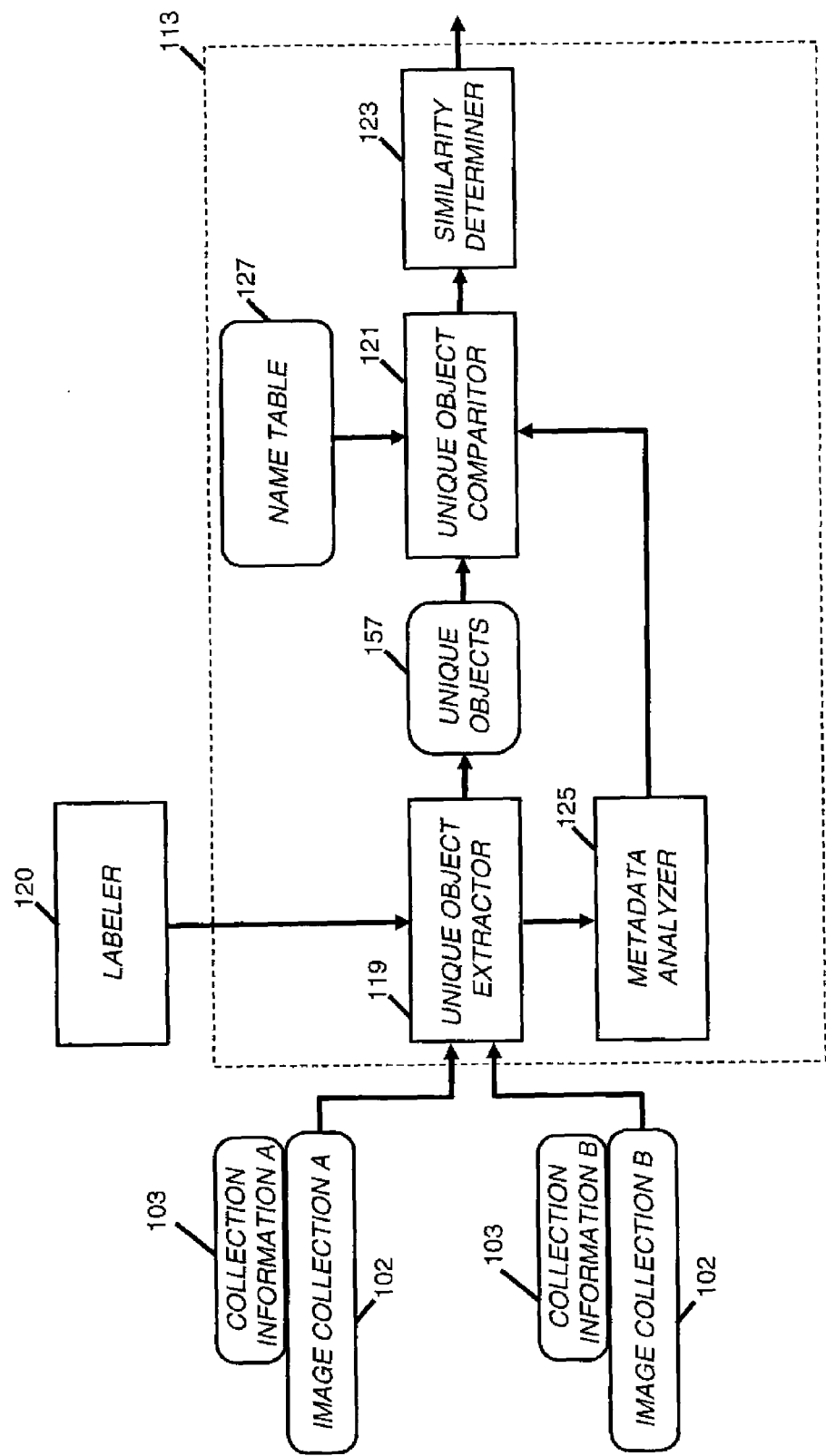
FIG. 5 shows a more detailed view of the collection comparator from FIG. 4.

FIG. 5 shows a more detailed view of the collection comparator 113 from FIG. 4. In this embodiment, the collection comparator 113 looks for commonality between image collections 102. The assumption is that the users of image collections 102 containing common unique objects are more likely to want to establish links between their image collections 102 than those users of image collections 102 without common unique objects. A unique object is an object of which there is only one in existence. For example, every person is a unique object. A model of car (e.g. 1998 Ford Windstar) is not unique because there are many in existence, but a particular Ford Windstar (i.e. Holly Gallagher's Ford Windstar) is a unique object. When a unique object appears in more than one image collection 102, the likelihood that the image collection users would like to share their image collections 102 increases. For example, if two image collections each contain images of Jennifer Anderson, then it is likely that the image collection users have a personal connection (e.g. they might both be friends with Jennifer, and perhaps with each other as well) and would like to establish a link between their image collections 102. For the purposes of illustration, the collection comparator 113 is shown to be comparing image collections A and B to produce a single element $s_{AB}$ of the similarity matrix 115. In practice, the collection comparator 113 can produce a similarity score between any number of pairs of image collections 102. The collection comparator 113 analyses images and videos from the image collections and additionally the collection information 113 associated with each image collection is examined to produce the similarity score.

The image collections 102 are analyzed with a unique object extractor 119. The purpose of the unique object extractor 119 is to identify unique objects 157 and extract features describing the unique objects within the images and videos of the image collections. For example, the unique object extractor 119 is preferably a face detector and the associated features are related to facial measurements as will be described below. The unique object extractor 119 can be a vehicle detector. Image processing techniques for identifying these and other objects are well known in the art, and are described for example in U.S. Pat. No. 6,829,384. The unique object extractor 119 locates the unique objects 157 from images and videos. However, the unique object extractor 119 does not necessarily recognize the identity of the object (e.g. the name of the person when the unique object extractor is a face detector.) For example, when the unique object extractor 119 is a human face detector, unique objects are being located by the unique object extractor 119, despite the fact that their unique identities (i.e. names) are unknown.

The unique object comparator 121 then compares the unique objects 157 found in the two image collections to determine the likelihood that a common unique object appears in each of the two image collections and then the similarity determiner 123 outputs the similarity score for the two image collections.

The likelihood can be determined by evaluating $P(i_A=j_B|f_{iA},f_{jB})$ that the $i^{th}$ unique object from collection A is the same as the $j^{th}$ unique object from image collection B, given the features ($f_{iA}$ and $f_{jB}$) associated with the objects. Solving for $P(i_A=j_B|f_{iA},f_{jB})$ is a problem that is similar to those often discussed in the fields of pattern recognition and machine learning. Many different classification techniques can be used. In fact, the classification technique that is used can depend of the type of unique object that is being compared (e.g. face, car, pet, national monument, famous painting, etc.)

A useful and computationally easy approximation to $P(i_A=j_B|f_{iA},f_{jB})$ is $$P(i_A=f_b|f_{iA},f_{jB}) \approx f(D(f_{iA},f_{jB})) \quad (1)$$

That is, the probability $P(i_A=j_B|f_{iA},f_{jB})$ can be approximated as a function $f(\ )$ of the distance $D(f_{iA},f_{jB})$ between feature vectors $f_{iA}$ and $f_{jB}$. Preferably the distance between $f_{iA}$ and $f_{jB}$ is Euclidean distance. Alternatively, the distance can be derived with weights learned from training algorithms such as AdaBoost. For example, $$f(D(f_{iA},f_{jB}))=\exp(-D(f_{iA},f_{jB})/T_1) \quad (2)$$

where $T_1$ is an adjustable parameter.

In another embodiment, the unique object extractor 119 can analyze the metadata of images and videos from the image collection along with the content of the images and videos themselves. This information enhances the ability of the unique object comparator 121 to determine the likelihood that a specific unique object 157 found in one image collection is also in another image collection. For example, the metadata can include the date and time of image capture, the ambient air temperature at the time of image capture, the geographic location of image capture, and any label. The label can be associated with the image as a whole (e.g. a caption like "Jenny in the watermelon eating contest"). Or the label can be associated with a set of 2 or more images (e.g. "Camping at Letchworth Park, 2005"). Or the label can be associated with a particular region of the image, or a set of features derived from a region of the image. For example, commonly assigned U.S. patent application Ser. No. 11/342,053 filed Jan. 27, 2006, entitled "Finding Images With Multiple People or Objects" by Andrew C. Gallagher the disclosure of which is incorporated herein, describes processes for labeling human faces in images with a labeler 120. The labeler 120 allows a user to provide a label that describes a unique object detected by the unique object extractor 119. The label "Hannah" can be associated with locations in the image that define Hannah's location in the image (for example, the coordinates of the left and right eyes). The terms "tag", "caption", and "annotation" are used synonymously with the term "label."

The unique object comparator 121 considers the labeled unique objects 157 from both image collections and determines whether a labeled unique object from collection A is also a labeled unique object from collection B. The unique object comparator 121 considers a list of labeled unique objects from multiple image collections 102. For example, an illustrative list of unique objects from the unique object extractor 119 is:

TABLE 1

Example list of labels and features from unique objects

| Unique Object Item Number | Label | Image Collection | Features |
|---|---|---|---|
| 1 | Dan | A | [0.23 .09] |
| 2 | Holly | A | [0.45 0.75] |
| 3 | Margaret | A | [0.53 0.67] |
| 4 | Margaret | A | [0.55 0.70] |
| 5 | Andy | A | [0.75 0.2] |
| 1 | Maggie | B | [0.57 0.74] |
| 2 | Maggie | B | [0.46 0.62] |
| 3 | Andy | B | [0.78 0.24] |
| 4 | Holly | B | [0.4 0.7] |
| 5 | Holly | B | [0.38 0.78] |
| 6 | Dan | B | [0.2 0.6] |
| 7 | Penny | B | [0.8, 0.83] |

In Table 1, there are 5 instances of unique objects from image collection A and 7 from image collection B. Within a single image collection, a repeated label indicates another image of the unique object. For example, items 3 and 4 from image collection A are different images of the same person (i.e. unique object) "Maggie". Image collection A contains 4 distinct unique objects ($Dan_A$, $Holly_A$, $Margaret_A$, and $Andy_A$, where the subscript indicates the image collection that the unique object is from), and image collection B contains 5 distinct unique objects ($Maggie_B$, $Andy_B$, $Holly_B$, $Dan_B$ and $Penny_B$). The question to solve is this: Are any of the unique objects that appear in image collection A likely to be the same as unique objects from image collection B?

To solve this problem, the unique object comparator 121 computes the likelihood $P(i_A=j_B|f_{iA},f_{jB},m_{iA},m_{jB})$ that the $i^{th}$ unique object from collection A is the same as a $j^{th}$ unique object from image collection B, given the features ($f_{iA}$ and $f_{jB}$) and metadata ($m_{iA}$ and $m_{jB}$) associated with the unique objects 157. In other words, image analysis, features, labels, and other metadata are used to determine if image collections have a unique object in common. Recall that the metadata includes any name labels that are associated with the unique objects. If the assumption is made that the metadata is independent of the feature vectors, then the likelihood can be estimated to be:

$$P(i_A=j_B|f_{iA},f_{jB})P(i_A=j_B|m_{iA},m_{jB}) \quad (3)$$

As shown by Schneiderman et al in U.S. Pat. No. 6,829,384, using a product of probabilities is useful for classification even when statistical independence does not hold.

When there are many instances of a particular unique object 157, then the distribution of the features of that unique object 157 can be learned. For example, P(f|Holly) is the distribution of the feature values, given that the unique object is Holly. The distribution can be represented with histograms, or modeled with an appropriate distribution such as a Gaussian distribution. Then the computation of $P(i_A=j_B|f_{iA},f_{jB})$ can be rewritten as $P(i_A=j_B|P(f|iA),P(f|jB))$ essentially measures the statistical difference between the distribution P(f|iA) and the distribution P(f|jB). This can be accomplished with many distance metrics, such as the Bhattacharya Distance that measures the distance $d_B$ between two discrete distributions p and q:

$$d_B(p,q) = \left(\frac{1}{2}\sum_k \left(\sqrt{P_k}-\sqrt{q_k}\right)^2\right)^{1/2}$$

Then the probability $P(i_A=j_B|f_{iA},f_{jB})$ can be estimated as $1-d_B$, or according to Equation (2).

On the other hand, when there are very few instances of a particular unique object in an image collection, then it is difficult to estimate the conditional distribution of feature values P(f|iA). In that case, the probability $P(i_A=j_B|f_{iA},f_{jB})$ is estimated by measuring the distances $D(f_{iA},f_{jB})$ between the features associated with each pair of an object i from image collection A and an object j from image collection B. Then the minimum distance $D_{min}(f_{iA},f_{jB})$ used to derive the probability $P(i_A=j_B|f_{iA},f_{jB}) \approx f(D_{min}(f_{iA},f_{jB}))$. Alternatively, the average or median of the collection of distances $D(f_{iA},f_{jB})$ between each pair of an object i from image collection A and an object j from image collection B can be used as the distance for computing $P(i_A=j_B|f_{iA},f_{jB})$.

The term $P(i_A=j_B|m_{iA},m_{jB})$ is estimated by computing the similarity between the metadata associated with the unique objects 157, including labels. Such probabilities can be learned via training with a large amount of metadata using techniques standard in the field of pattern recognition and machine learning. When the metadata includes text labels, the probability likelihood term $P(i_A=j_B|m_{iA},m_{jB})$ indicates the degree of match between the two text labels. Text matching is well described in the literature, for example U.S. Pat. No. 5,630,121 describes processes for determining the similarity between words from text labels using natural language processing. The authors teach a method that will produce a good match between labels that are synonyms such as "dog" and "pooch" or hypernym-hyponym pairs such as "mammal" and "rabbit." This method can be extended to handle names associated with people. A name associated with a person can be a first name (e.g. "Tom", "Thomas"), complete given name (e.g. "Ethan Edward Gallagher") or a nickname (e.g. "Mom", "Dad", "Jimmy", "The Bus"). For example, a single unique person can appear in two different image collections A and B. In collection A, instances of the unique person's face are labeled as "Jenny," but in collection B instances of the same person are labeled "Jennifer". The label similarity $P(i_A=j_B|m_{iA},m_{jB})$ will have a high score because Jenny and Jennifer are name synonyms. On the other hand, if the two image collections contain images of two different people who happen to have the same name and label (e.g. "Jenny") then the label similarity will be high, but the corresponding similarity between the facial features $f_1$ and $f_2$ derived from the first and second image collections respectively will likely be low, and therefore the probability $P(i_A=j_B|f_{iA},f_{jB},m_{iA},m_{jB})$ will be low as well. Names, common name misspellings, and common nicknames are stored in association a name table 127 that is accessed by a metadata analyzer 125 for determining the likelihood that a unique object (in this case a person) appears in both of the image collections. For example, a database of first names and variations exists and can be searched on the Internet at www.incompetech.com/named/multi.pl. High probabilities (e.g. $P(i_A=j_B|m_{iA},m_{jB})=1.0$) are assigned for exact name matches. Another example is when a face is named "me" in image collection A, and "Jeff" in image collection B, and the name of the user of image collection A is "Jeff". Medium high probabilities (e.g. $P(i_A=j_B|m_{ia},m_{jB})=0.9$) are assigned for commonly occurring name variations such at "Jenny" and "Jennifer." Note that specific name variations can also be entered by the user via a labeler 120. For example, the name "Jerome Bettis" can be associated with the nickname "The Bus" when the user knows that a particular nickname is often used to describe the person. Intermediate probabilities (e.g. $P(i_A=j_B|m_{iA},m_{jB})=0.4$) result from less likely, but still plausible name labels (e.g. a face named "Sarah" in one image collection, and "Mom" in a second image collection is plausible because the gender of the labels match.) Low probabilities (e.g. $P(i_A=j_B|m_{iA},m_{jB})=0.2$) result from name labels that are possibly to refer to the same person (e.g. a face named "Jeff" in one image collection and a face named "Tom" in a second image collection. This is possible when an individual is known by different first names in different social settings.) Very low probabilities (e.g. $P(i_A=j_B|m_{iA},m_{jB})=0.0$) result from name labels that are unlikely to refer to the same person (e.g. a face named "Jenny" in one image collection and a face named "Dad" in a second image collection, or a face named "Tom Johnson" in one image collection and a face named "Tom Smith" in another.)

Image capture location is also considered in computing $P(i_A=j_B|m_{iA},m_{jB})$. The probability that unique objects are the same increases when the objects are nearly in the same location at the same time. Likewise, a unique object cannot be in two places at the same time. Preferably, the traveling time t between two locations corresponding to pairs of images, one from collection A containing unique object $i_A$ and one from collection B containing unique object $j_B$ is computed. The travel time t can be estimated with algorithms designed to compute the fastest path between two points, considering all modes of travel. For example, the travel time between two points can include portions of the trip traveled by airplane, subway, taxi, and by foot. If the travel time exceeds the difference in image capture times between the two images, then $P(i_A=j_B|m_{iA},m_{jB})$ is low or zero. For example, if an image collection A image is captured Moab Utah at 1:00 EST 1/1/2006 and an image collection B image is captured in Brockport N.Y. at 3:00 EST 1/1/2006, the travel time t exceeds the image capture time difference of 2 hours. Therefore, it is unlikely that any unique object in the first image could also be in the second image, and vice-versa.

For an illustrative example, consider again the 4 distinct objects from image collection A and the 5 distinct objects from image collection B in Table 1. A matrix U can be constructed having elements:

$$u_{ij}=P(i_A=j_B|f_{iA},f_{jB})$$

Using the information contained in Table 1, and formulas (1) and (2) with $T_1=\frac{1}{3}$, the following U matrix is produced:

$$U = \begin{bmatrix} 0.18 & 0.18 & 0.15 & 0.22 & 0.06 \\ 0.70 & 0.16 & 0.81 & 0.42 & 0.34 \\ 0.87 & 0.22 & 0.67 & 0.36 & 0.43 \\ 0.22 & 0.86 & 0.13 & 0.13 & 0.17 \end{bmatrix}$$

The rows correspond to the unique objects from collection A ($Dan_A$, $Holly_A$, $Margaret_A$, and $Andy_A$) and the columns correspond to the unique objects from collection B ($Maggie_B$, $Andy_B$, $Holly_B$, $Dan_B$ and $Penny_B$). For example, the likelihood that $Margaret_A$ is $Maggie_B$, based on the given example feature values, is 0.87;

A matrix V can be constructed with the elements:

$$v_{ij} = P(i_A = j_B | m_{iA}, m_{jB})$$

Using the information contained in Table 1 and the aforementioned probabilities, the following V matrix is produced:

$$V = \begin{bmatrix} 0.0 & 0.2 & 0.0 & 1.0 & 0.0 \\ 0.2 & 0.0 & 1.0 & 0.0 & 0.2 \\ 0.9 & 0.0 & 0.2 & 0.0 & 0.2 \\ 0.0 & 1.0 & 0.0 & 0.2 & 0.0 \end{bmatrix}$$

Finally, a matrix W containing elements $w_{ij}$ representing $P(i_A = j_B | f_{iA}, f_{jB}, m_{iA}, m_{jB})$ is formed by computing $w_{ij} = v_{ij} u_{ij}$.

Accordingly, the W matrix for the information contained in Table 1 is:

$$W = \begin{bmatrix} 0.0 & 0.04 & 0.0 & 0.22 & 0.0 \\ 0.14 & 0.0 & 0.81 & 0.0 & 0.06 \\ 0.78 & 0.0 & 0.13 & 0.0 & 0.08 \\ 0.0 & 0.86 & 0.0 & 0.03 & 0.0 \end{bmatrix}$$

Therefore it is likely that $Holly_A$ is $Holly_B$ (score 0.81), $Margaret_A$ is $Maggie_B$ (score 0.78) and $Andy_A$ is $Andy_B$ (score 0.86).

The similarity determiner 123 then outputs a similarity score $s_{AB}$ indicating the likelihood that the collection users would want to establish a link between their image collections. The similarity score is derived by considering the likelihoods that one or more unique objects are common to both image collections. Preferably, the similarity score is the maximum of all the $P(i_A = j_B | f_{iA}, f_{jB}, m_{iA}, m_{jB})$ values from the unique object comparator 121 that have been computed (e.g. by considering each pair of one object from image collection A and a second object from image collection B). Alternatively, the similarity score can be computed by also considering the type of object that is described by the feature vectors that produced the value of $P(i_A = j_B | f_{iA}, f_{jB}, m_{iA}, m_{jB})$. For example, when two image collections contain images of Jennifer Anderson, it is likely that the users would want to establish a link. However, when two image collections are found to each contain images of the Washington Monument, the users would not necessarily want to establish a link between their respective image collections. Therefore, the probabilities $P(i_A = j_B | f_{iA}, f_{jB}, m_{iA}, m_{jB})$ are each weighted with a weighting factor $W_1$ that depends on the object type, and the similarity score $s_{AB}$ is produced by finding the maximum weighted probability. An example list of weighting factors $W_1$ based of the object type is shown below:

People 0.9
Famous statues/buildings 0.1
Pets 0.7
Land formations 0.2
Celebrities 0.2
Vehicles 0.6
Non-famous buildings 0.3

Those skilled in the art will recognize that links between image collections 102 can be formed with user input 804 when a collection user initiates a request to another collection user, as shown in FIG. 3, or when the collection networker 802 determines, through analysis of the image and metadata content, that there is a good likelihood that the users of image collections 102 would appreciate linking their image collections 102.

Figure 6:
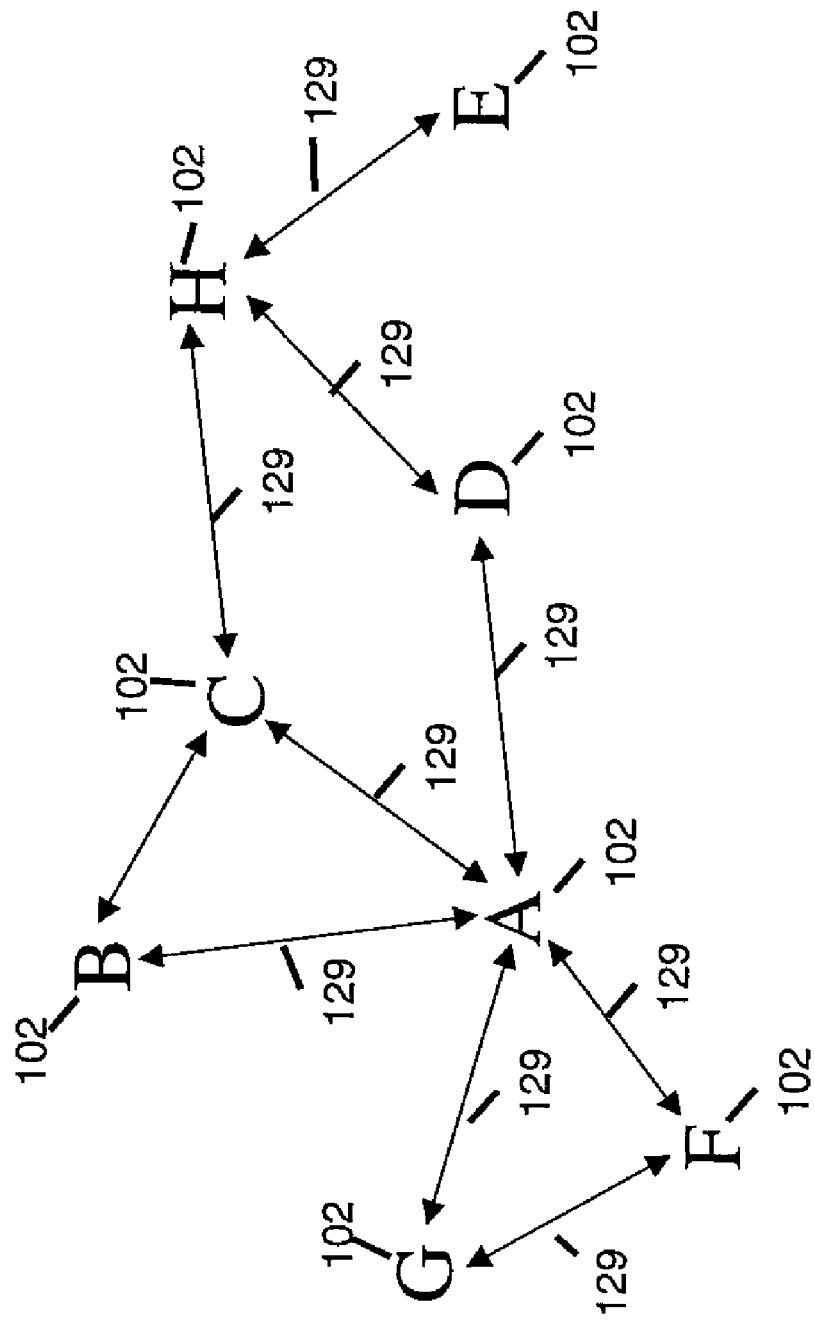
FIG. 6 illustrates a set of image collections and the network of links between image collections.

The links between image collections 102 can be shown graphically, for example see the network of links 129 shown in FIG. 6. Image collections 102 are symbolized with capital letters and links 129 are indicated with a double-headed arrow. A set of three or more image collections 102 with mutual links form a sharing group. For example, image collections A, F, and G are a sharing group because each image collection user would have access to the image collections of the other image collection users.

Referring back to FIG. 5, the metadata analyzer 125 can also determine the likelihood that two image collection users would want to link their collections based on the collection information 103. Another measure of similarity of two image collections is based on the network of links itself. The distance between two image collections (A and B) through the collection of links 105 is the minimum number of existing links that must be traveled to get from image collection A to image collection B. This distance can be computed by finding the minimum value (i>0) of integer i such that the $(A,B)^{th}$ element of $L^i$ is 1. For example, in FIG. 6, image collections A and G are separated by distance $D_S(A,G)=1$. This means that there is a link between image collections A and G. A distance of 2 separates image collections G and D. This distance is considered by the similarity determiner 123 to assign a similarity score for two image collections. For example, the similarity determiner 123 can compute an additional weighting factor $W_2 = \exp(-(D_s(A,B)-T_3)/T_2)$ where $T_2$ and $T_3$ are selectable parameters, preferably $T_3=1$ and $T_2=3$. This weighting factor $W_2$ can be combined (multiplied) by the probability $P(C|f_1, f_2, m_1, m_2)$ from the unique object comparator 121 by the similarity determiner when producing the similarity score $s_{AB}$.

As previously discussed, having image collections 102 that are linked facilitates sharing image collections 102 or portions of image collections 102. When an image collection is shared from the user to another person, the other person is authorized to access the shared images and collection information. The extent of this access can vary depending on the application. For example, the user might share copies of images and video from the collection and the associated metadata. Alternatively, the user might share low-resolution versions of the images with the other person. The shared images can be viewed on a computer monitor, or on an LCD screen such as integrated with a camera or cellular phone. The access granted by the sharing of images can be permanent access, or it can be set to expire after a certain length of time as set by the image collection owner. The access can be set to expire after a certain event. For example the access can expire after the other person has viewed the images once.

When one or more images have associated labels, then the links between image collections 102 are useful for propagating labels and features from one image collection 102 to another. Some image collection users invest a great deal of time captioning images and videos and labeling people and other objects within the images and videos. Other image collection users label nothing in their collections. By using the links between image collections, even an image collection user who does not label her images can benefit from the labeling that was done by the users of image collections 102 to which her image collection is linked. This allows for searching an image collection with text and retrieving relevant images. For example, Holly labels the people appearing in her image collection "Andy", "Holly", "Hannah", "Jonah", and "Ethan". Holly shares her image collection with her sister Penny, who does not label her own image collection. The link between the image collection allows the characteristics (features) of "Andy", "Holly", "Hannah", "Jonah", and "Ethan" to be known, so instances of these people in Penny's image collection are automatically annotated.

Figure 7:
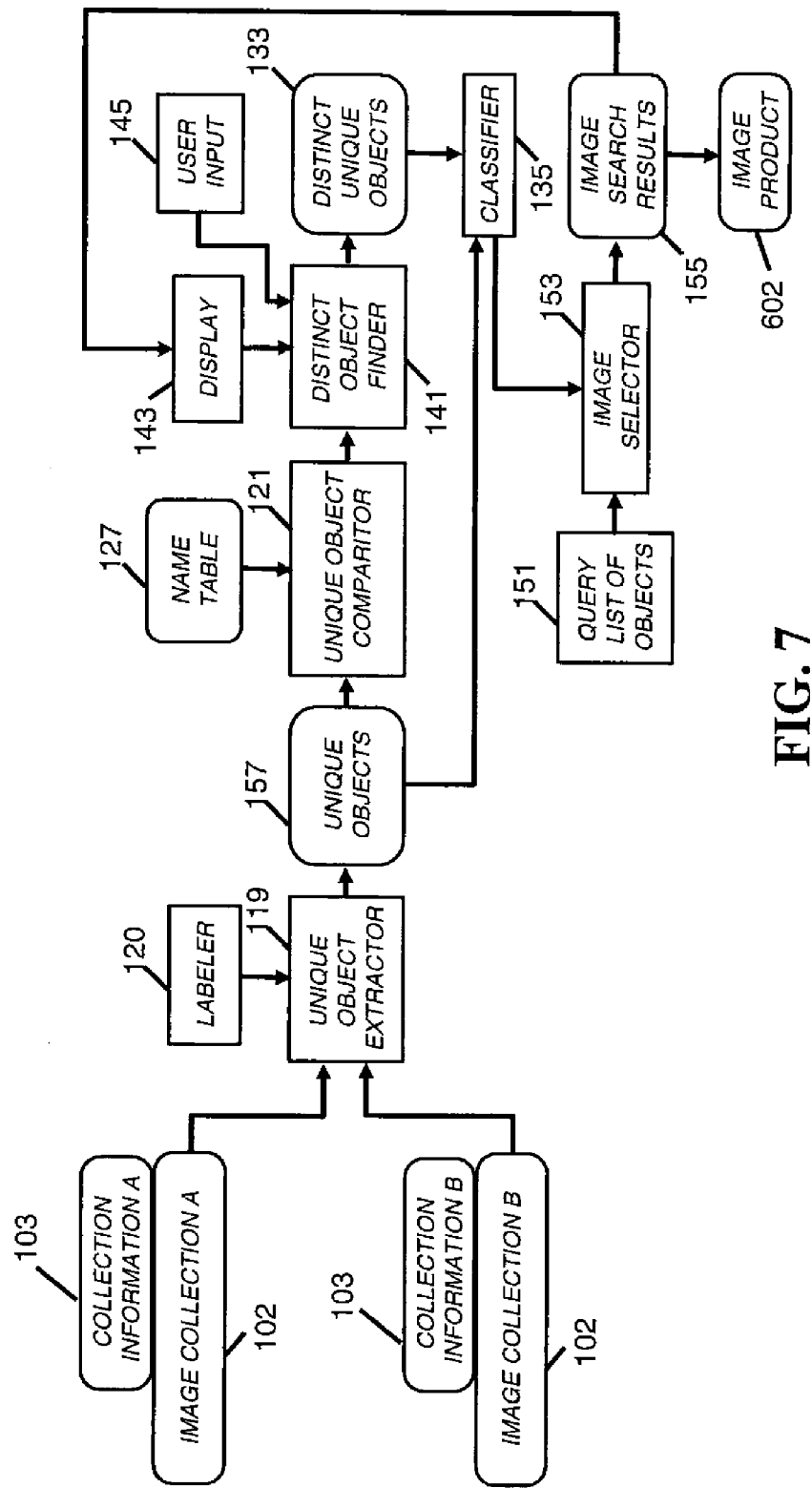
FIG. 7 is a block diagram illustrating the use of labels from multiple image collections for classifying and searching image collections.

FIG. 7 illustrates the method by which image collections 102 that are linked are used to enhance the searchability of each of the linked image collections. In order to simplify the description, assume that image collections A and B are linked ($l_{ab}=l_{ba}=1.0$). Therefore, each image collection 102 has access to the images and videos, features, metadata (including capture metadata such as location and capture time, and labels such as name labels), and collection information 103 of the other collection. In situations where the connection is not reciprocal (e.g. $l_{ab}=1.0$, $l_{ba}=0$), those skilled in the art will recognize image collection B will benefit from any labels provided by the user of image collection A, but not vice-versa.

Recall from FIG. 5, images and videos from the image collections are passed to the unique object extractor 119. The unique object extractor 119 detects the unique objects such as faces, cars, etc., as previously described, and also extracts features associated with the object. The objects (and associated extracted features) can be associated with labels. For example, if the unique object extractor 119 detects a face having eye coordinate locations at (100, 100) and (140,105), and the user indicated through the user interface that the face is "Margaret", then the face is represented by features (e.g. eye coordinate locations) and is associated with a name label "Margaret". Feature extraction will be described in greater detail below.

Recall the unique object comparator 121 computes the likelihood $P(i_A=j_B|f_{iA},f_{jB},m_{iA},m_{jB})$ that the $i^{th}$ unique object from collection A is the same as a $j^{th}$ unique object from image collection B, given the features ($f_{iA}$ and $f_{jB}$) and metadata ($m_{iA}$ and $m_{jB}$) associated with the objects. These likelihoods are the elements of the matrix W. Essentially, the unique object comparator 121 determines the similarity between the unique objects of two (or more) image collections 102.

The unique object comparator 121 produces a set of distinct unique objects 133 that are used to construct a classifier 135 for classifying the identities of unlabeled objects. The unique object comparator 121 has been described in reference to FIG. 5. In this embodiment a link exists between images collections 102 A and B. Because of that, the function of the unique object comparator 121 can be slightly different than as described with reference to the unique object comparator 121 from FIG. 5. For example, prior probabilities important in the computation of $P(i_A=j_B|f_{iA},f_{jB},m_{iA},m_{jB})$ can be different when it is known there is some kind of link (e.g. often a social connection) between the collection users.

Also, in cases where the social relationship between the two image collection users is known by the unique object comparator 121, that information is used to improve performance. For example, assume image collections A and B both have unique objects 157 labeled as "Mom". If the unique object comparator 121 knows that the image collection users are siblings, then the term $P(i_A=j_B|m_{iA},m_{jB})$ will be large (near or equal to 1.0) when considering whether $Mom_A$ is the same as $Mom_B$. Alternatively, if the unique object comparator 121 knows that the image collection users are not related, then the term $P(i_A=j_B|m_{iA},m_{jB})$ will be low (near or equal to 0.0) when considering whether $Mom_A$ is the same as $Mom_B$. Information about the social relationship between linked image collection users can be entered into the collection information 103 using any standard user input device by either image collection user and can be shared with the other image collection owner. For example, when a link is established between the users of image collections A and B, the user of image collection A is asked "Collection User B is my _____" and is given the following list of social relationship choices to fill in the blank:

Brother
Sister
Mother
Father
Son
Daughter
Cousin
Aunt
Uncle
Relative
Friend

The user of image collection A's user input 145 is used to indicate the social relationship. When the gender of the user of image collection B is known, the list of social relationship choices can be shortened to a more appropriate set, e.g. if the user of image collection B is female, then the list of social relationship choices shown to the user of image collection A is:

Sister
Mother
Daughter
Cousin
Aunt
Relative
Friend

A similar question can also be posed to the user of image collection B. One response is all that is needed to define the relationship between the two image collection users.

The distinct object finder 141 inputs the likelihoods from the unique object comparator 121 and determines the set of distinct unique objects 133. The distinct object finder 141 has two processes for determining that a specific unique object from one image collection is the same as a specific unique object from a second image collection 102. First, when the likelihood (i.e. belief) value of $w_1$ exceeds a threshold $T_2$ (preferably $T_2=0.9$) Second, the distinct object finder 141 uses user input 145 to confirm whether $i_A=j_B$ are the same unique object. When the likelihood value $w_{ij}$ exceeds a threshold $T_3$ (preferably $T_3=0.75$), the distinct object finder 141 displays portions of two images on a display 143. The display can be a CRT, LCD, on a camera, computer, cellular phone, etc. One of the image portions is an example of the unique object i from image collection A, and the second image portion is an example of the unique object j from image collection B. The image portions can be cropped areas of images or frames or snippets of video. The user (preferably the user of image collection A or B) can then indicate (via a button click, voice command, mouse click, or via any other input device) whether the displayed image portions show the same specific unique object.

FIG. 8 shows an example display of an image portion 251 corresponding to a face from image collection A, and an image portion 253 corresponding to a face from image collection B. These image portions correspond to faces detected by the unique object detector 119. Accompanying text labels can also be shown on the display adjacent to the corresponding image portion. Because the image portions show the same person, the user indicates to the distinct object finder 141 that the unique objects are the same. A message 255 can be displayed with the image portions such as "Are these the same object?" and allow the user to select yes or no from a menu selection. Alternatively, the message 255 can be tailored to the type of unique object that is being displayed. For example, the message 255 is "Are these the same person?" when the unique object detector 119 finds the displayed objects with a face or person detector. FIG. 9 shows an example where the image portions 251 and 253 show different people, and the user indicates to the distinct object finder 141 that the unique objects are distinct.

Referring back to FIG. 7 the distinct object finder 141 outputs the set of distinct unique objects 133. These distinct unique objects 133 are used to train a classifier. When the unique objects 157 from the unique object extractor 119 are human faces, the distinct unique objects 133 are individuals (e.g. specific unique people with names). For example, based on the data from Table 1, the 6 distinct unique objects (assuming user input 145) between image collections 102 A and B are:

$Dan_A$,
$Holly_A=Holly_B$,
$Margaret_A=Maggie_B$,
$Andy_A=Andy_B$
$Dan_B$
$Penny_B$ Between the two image collections, there are one or more examples of each of these distinct unique objects. Those skilled in the art will recognize that the names of the distinct unique objects can have many variations (e.g. one variation per image collection appearance).

The classifier 135 is trained based on the labels and the feature values associated with the objects, as is well known in the art of pattern recognition. The classifier can be of any type. There are several advantages to this arrangement. First, in general, the performance of classifiers 135 improve as the amount of training data increases. By using samples of a unique object from more than one image collection, the performance should improve. Second, the classifier 135 is able to classify the identity (i.e. label) of a unique object even in cases where no labeled samples in that image collection exist, so long as a sample is present in a linked image collection 102. The classifier 135 can label an image with labels that are relevant to the user of the image collection as well as relevant to the users of linked image collections by ensuring that the labels contain all the name variations found by the distinct object finder 141. For example, the classifier 135 can label a unique object as being "MargaretA" and "MaggieB" with 67% probability.

Referring again to FIG. 7, a user submits a query list of objects 151 to an image selector 153 for producing an image search result. The image selector 153 uses the query list of objects 151 and the classifier 135 to produce a set of image search results 155. The image search results 155 are the set of images believed to be relevant to the query list of objects 151. The query list of objects 151 can be a set of person names. The images and videos from the image search results 155 can be sent to the display 143 for viewing.

The collection user wishes to find images and videos from her image collection and the image collections that are shared with her that contain images from the query list of objects 151. The query list of objects can contain unique objects, such as specific people (e.g. "Find Images containing Hannah and Jonah").

The image selector 153 interprets the query list of objects 151, while considering the source of the query. For example, if the user of image collection A searches for images containing "Margaret", the image search results 155 will contain images labeled "Margaret" in image collection 102 A, as well as images labeled "Maggie" from image collection 102 B.

The image selector 153 also considers who supplies the query list of objects 151 for searching the image collections. This is important for determining the actual identity of the unique object(s) that are the subject of the query. For example with respect to the data in Table 1, when the user of image collection A searches for images containing "Dan", she likely means the individual from her collection who is labeled $Dan_A$ (e.g. Dan Gallagher). However, when the user of image collection B searched for images containing "Dan", he probably means the person labeled $Dan_B$ in his collection (e.g. Dan Benton). Therefore, the image search results 155 depend on who initiates the query list of objects 151. For example, when image collection 102 B initiates a search where the query list of objects 151 is "Dan", the image selector 153 outputs image search results 155 where the highest ranked images are those containing $Dan_B$ (e.g. Dan Benton) that are found through image collection B and all image collections that are shared to the user of image collection B. Images containing other Dans (i.e. $Dan_A$=Dan Gallagher) from image collection B or image collections shared to the user of image collection B would be ranked at a lower position or omitted from the image search results 155 entirely.

Figure 10:
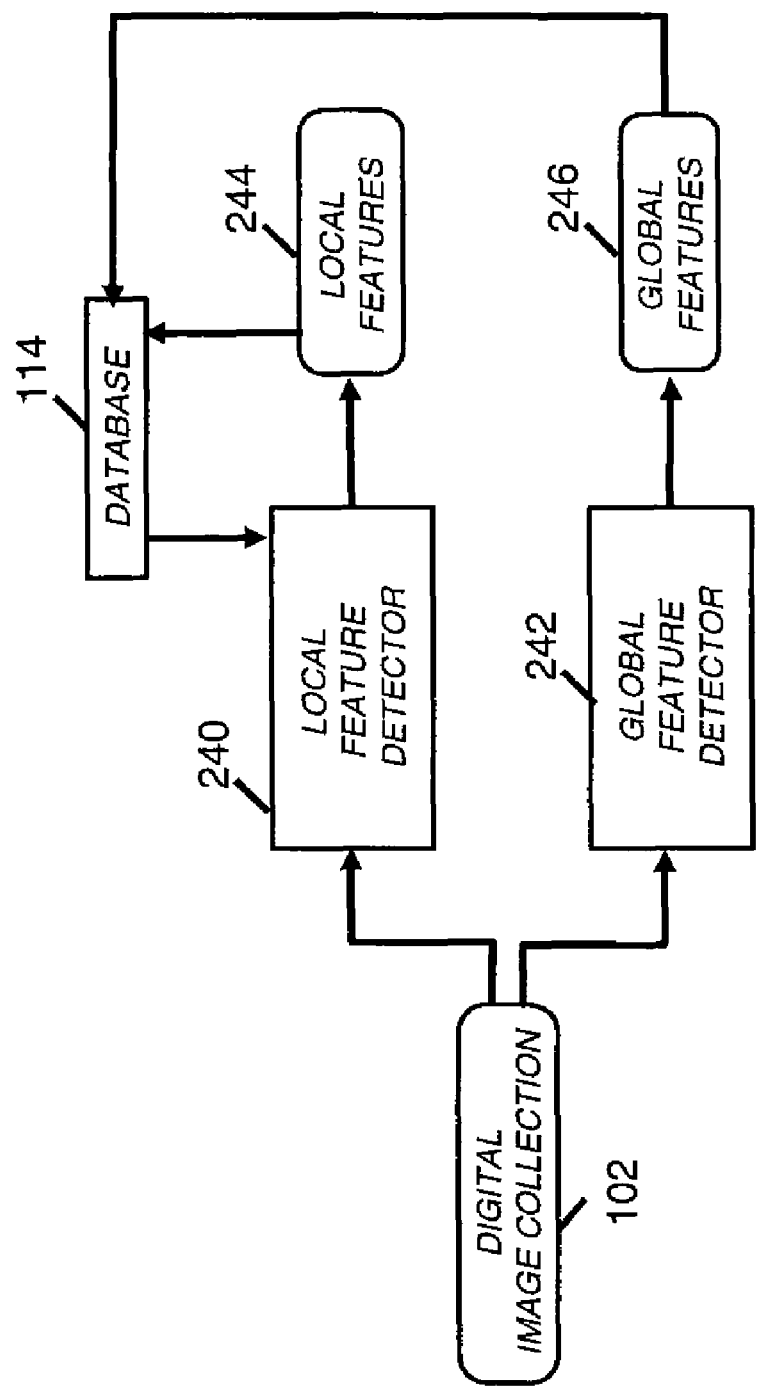
FIG. 10 shows a more detailed view of the feature extractor from FIG. 2.

The unique object detector 119 from FIG. 7 detects features associated with the detected object. The detected features are used to determine the unique identity of the unique object. FIG. 10 illustrates a method for extracting features associated with a detected unique object. Once the position of an object is known, the local feature detector 240 can detect local features 244 associated with the object. In the case where the object is person, once a face position is known, the facial features (e.g. eyes, nose, mouth, etc.) can also be localized using well known processes such as described by Yuille et al. in, "Feature Extraction from Faces Using Deformable Templates," *Int. Journal of Comp. Vis.*, Vol. 8, Iss. 2, 1992, pp. 99-111. The authors describe a method of using energy minimization with template matching for locating the mouth, eye and iris/sclera boundary. Facial features can also be found using active appearance models as described by T. F. Cootes and C. J. Taylor "Constrained active appearance models", *8th International Conference on Computer Vision*, volume 1, pages 748-754. IEEE Computer Society Press, July 2001. In the preferred embodiment, the method of locating facial feature points based on an active shape model of human faces described in "An automatic facial feature finding system for portrait images", by Bolin and Chen in the Proceedings of IS&T PICS conference, 2002 is used.

Figure 11:
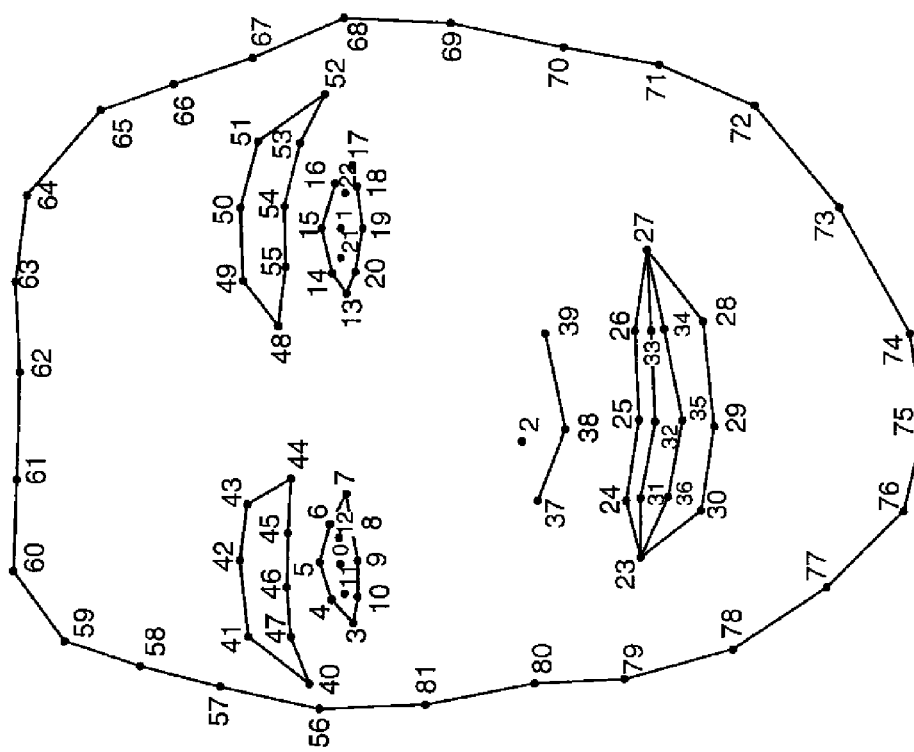
FIG. 11 is a representation of feature points extracted from a face.

The local features 244 are quantitative descriptions of an object. Preferably, the one set of local features 244 and one set of global features 246 is determined for each unique object. When the unique object is a person, preferably the local features 244 are based on the locations of 82 feature points associated with specific facial features, found using a method similar to the aforementioned active appearance model of Cootes et al. A visual representation of the local feature points for an image of a face is shown in FIG. 11 as an illustration. The local features can also be distances between specific feature points or angles formed by lines connecting sets of specific feature points, or coefficients of projecting the feature points onto principal components that describe the variability in facial appearance. These features capture the essence of the facial geometry. A good set of features can be obtained by determining the principle components of the facial feature points by gathering the feature point locations from a large number of images of people. Then each principle component describes a variation of a particular set of facial feature points from the average set of facial feature points. Some of these principle components relate to changes in expression or pose, while others relate to differences in appearance between unique individuals. A good set of features is obtained by projecting a set of feature points onto the principle components that related to the differences in appearance between unique individuals and ignoring the other principle components. Color cues are easily extracted from the digital image or video once the person and facial features are located by the unique object detector 119.

Alternatively, different local features can also be used. For example, an embodiment can be based upon the facial similarity metric described by M. Turk and A. Pentland. In "Eigenfaces for Recognition", *Journal of Cognitive Neuroscience*. Vol 3, No. 1. 71-86, 1991. Facial descriptors are obtained by projecting the image of a face onto a set of principal component functions that describe the variability of facial appearance. The similarity between any two faces is measured by computing the Euclidean distance of the features obtained by projecting each face onto the same set of functions.

The local features 244 could include a combination of several disparate feature types such as Eigenfaces, facial measurements, color/texture information, wavelet features etc.

Alternatively, the local features 244 can additionally be represented with quantifiable descriptors such as eye color, skin color, face shape, presence of eyeglasses, description of clothing, description of hair, etc.

For example, Wiskott describes a method for detecting the presence of eyeglasses on a face in "Phantom Faces for Face Analysis", *Pattern Recognition*, Vol. 30, No. 6, pp. 837-846, 1997. The local features contain information related to the presence and shape of glasses.

Again referring to FIG. 10, the global features 246 and local features 244 are stored in the database of individuals of interest 114. Global features associated with all people in an image are represented by $F_G$. The N sets of local features associated with the N people in an image are represented as $F_{L0}, F_{L1}, \ldots, F_{LN-1}$. The complete set of features for a person n in the image is represented as $f_n$ and includes the global features $F_G$ and the local features $F_{Ln}$. The M labels associated with the image are represented as $L_0, L_1, \ldots, L_{M-1}$.

Here is an example entry of labels and features associated with an image in the database 114:
Image 101_346.JPG
Label $L_0$: Hannah
Label $L_1$: Jonah
Features $f_0$:
  Global Features $F_G$:
  Flash Fire: No
  Shutter Speed: 1/724 sec.
  Camera Model Kodak C360 Zoom Digital Camera
  Aperture: F/2.7
  Local Features $F_{L0}$:
  Position: Left Eye: [1400 198] Right Eye: [1548 202]
  $C_0=[-0.8, -0-01]'$;
  Glasses: none
  Associated Label: Unknown
Features $f_1$:
  Global Features $F_G$:
  Flash Fire: No
  Shutter Speed: 1/724 sec.
  Camera Model Kodak C360 Zoom Digital Camera
  Aperture: F/2.7
  Local Features: $F_{L1}$:
  Position: Left Eye: [810 192] Right Eye: [956 190]
  $C_1=[0.06, 0.26]'$;
  Glasses: none
  Associated Label Unknown Referring again to FIG. 7, the classifier 135 uses features associated with the distinct unique objects 133 from multiple image collections 102 and the associated labels to determine the identities of unlabeled detected unique objects 157. The features associated with the detected unique objects 157 include some features having associated labels (known as labeled features). Other features (known as unlabeled features) do not have associated labels (e.g. all of the image and videos in the digital image collection 102 that were not labeled). The classifier 135 uses labeled features to classify the unlabeled features. This problem, although in practice quite difficult, is studied in the field of pattern recognition. Any of a number of classifiers can be used to classify the unlabeled features. In general, classifiers assign labels based on probability to unlabeled featured by considering the similarity between a particular set of unlabeled features and labeled sets of features. With some classifiers (e.g. Gaussian Maximum Likelihood), labeled sets of features associated with a single individual unique object are aggregated to form a model of appearance for the unique object 157.

Figure 12:
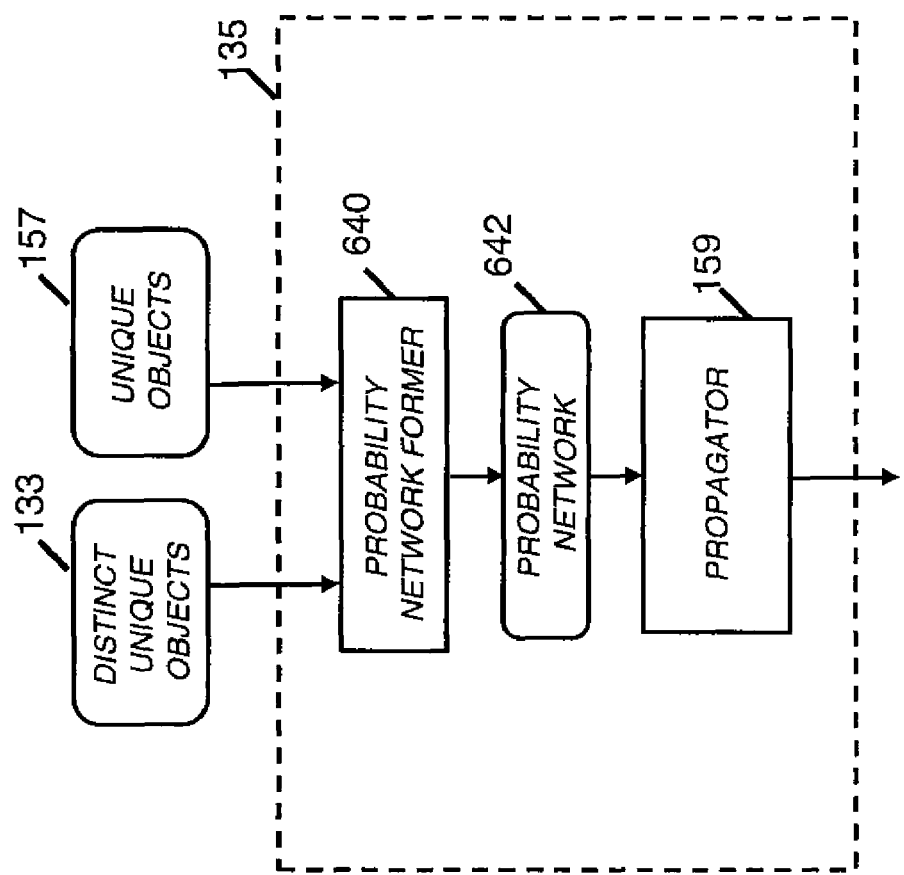
FIG. 12 shows a more detailed view of a preferred classifier from FIG. 7.

FIG. 12 shows an example of a preferred classifier 135. In the following description, the unique objects 157 are assumed to be people. Those skilled in the art will recognize that the classifier can be applied to classify other object types as well, with appropriate modifications and parameter tuning. The classifier 135 can measure the similarity between sets of features associated with two or more persons to determine the similarity of the persons, and thereby the likelihood that the persons are the same. Measuring the similarity of sets of features is accomplished by measuring the similarity of subsets of the features.

Figure 13:
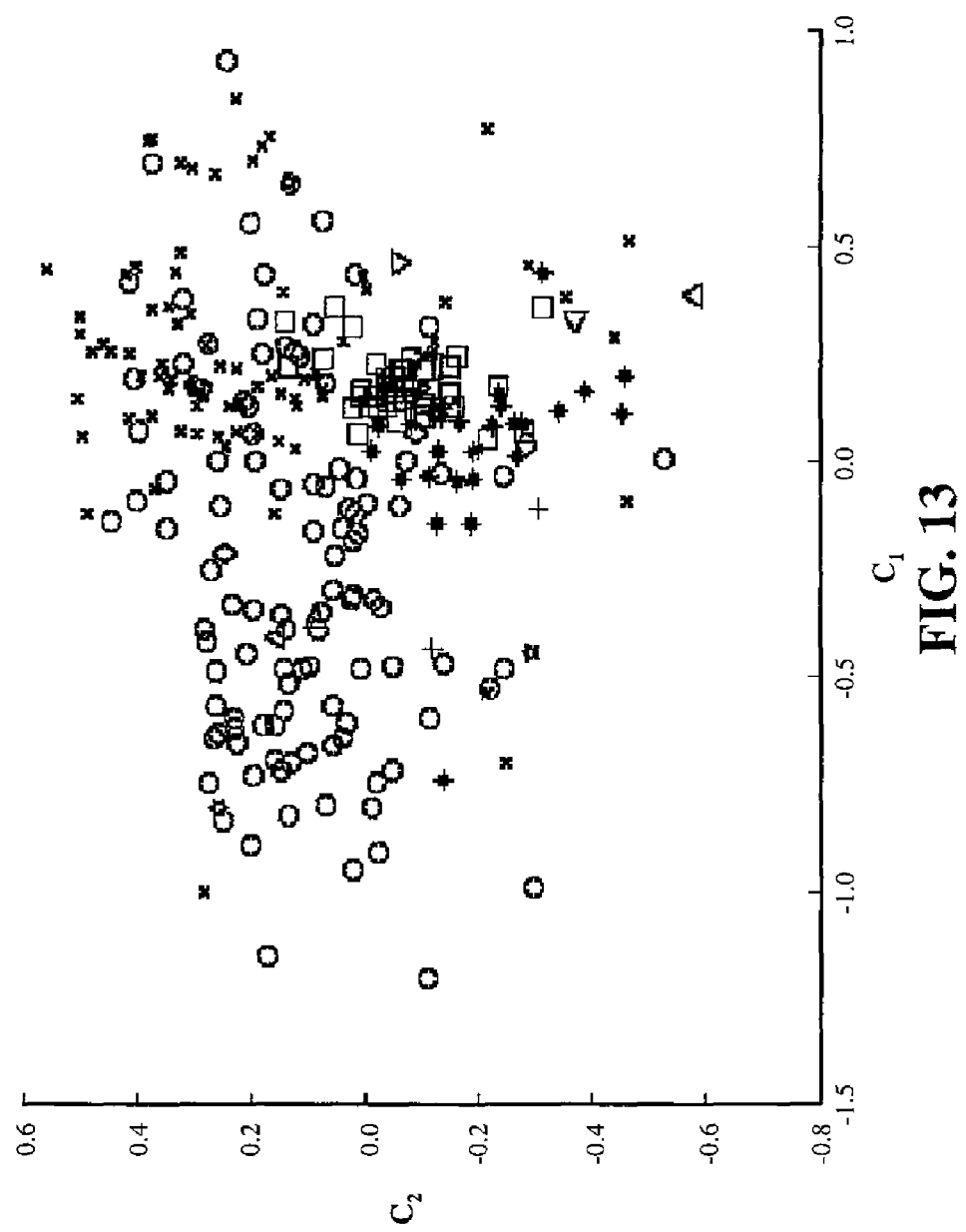
FIG. 13 shows a plot of local features for 299 faces, and the actual identities of the faces.

The classifier 135 uses a probability network 642 generated by a probability network former 640. FIG. 13 shows a plot of two features ($C_1$ and $C_2$) computed for 299 faces. These features are derived as previously mentioned by projecting facial feature points to the principle components and ignoring components associated with pose or expression. Different symbols represent different individuals (known by ground truth), although this information that identifies the identity of the unique object would not necessarily be known to the classifier in all cases.

Figure 14:
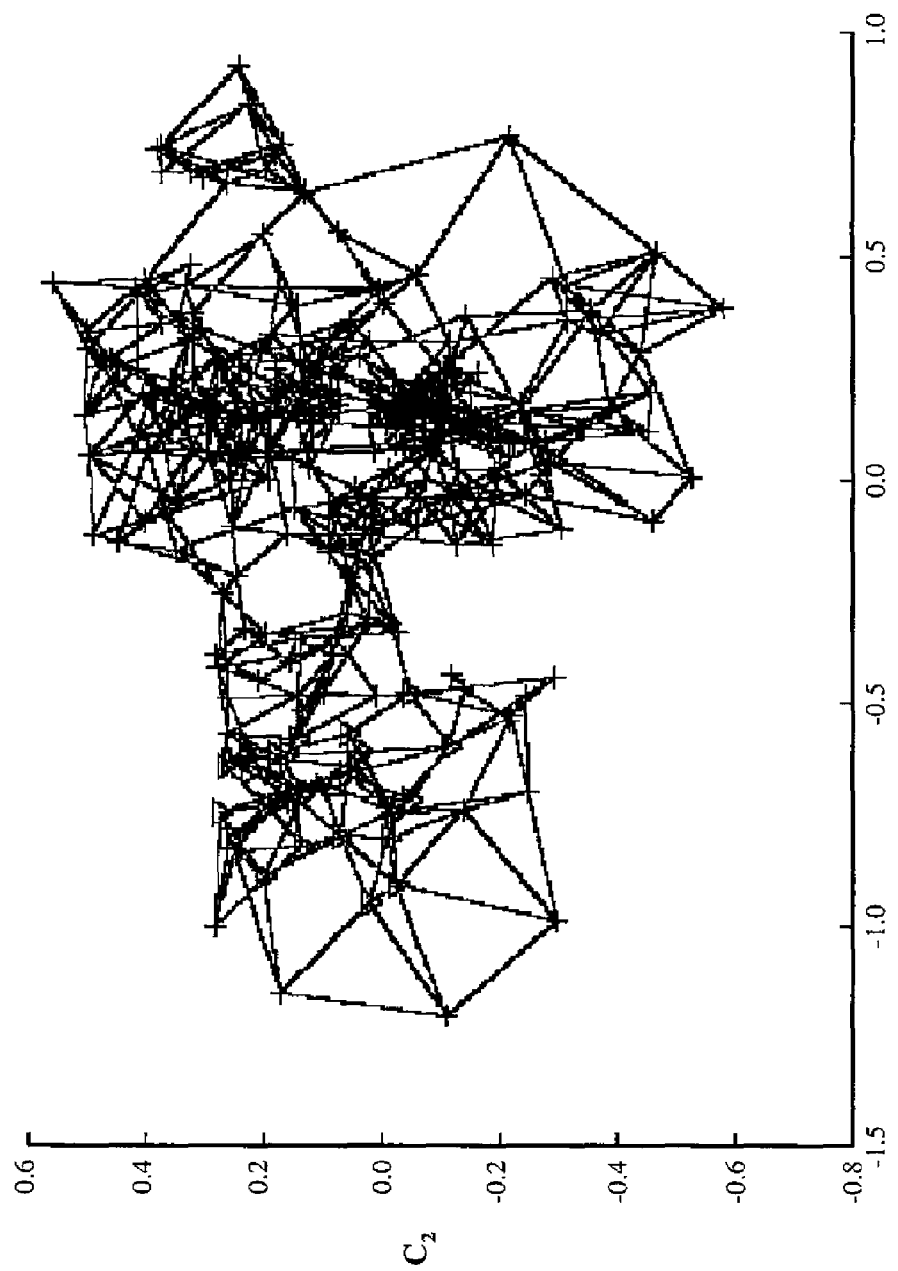
FIG. 14 shows a probability network formed from the local features of 299 faces.

The probability network former 640 forms a probability network 642 by establishing links between each point (also called a node). Each point represents a different detected person (though not necessarily a different individual). FIG. 14 shows an established probability network 642 formed by linking each point to its 5 nearest neighbors. The implicit assumption is that the identity of a person is likely to be the same as the identity of another person when the two share similar features. Each link has an associated probability weight (where i and j represent the indices of the first and second people joined by the link. Each person (e.g. the $n^{th}$ person from the $m^{th}$ image in the digital image collection 102)

is assigned a global index) indicating the likelihood that the two sets of features joined by the link have the same identity. The weights are established based on learning, from a large number of labeled feature sets, the likelihood that two people are the same individual based on the distance between their features. The probability network 642 is composed of the links and weights between feature points.

Some of the feature points have associated labels. These labels are propagated by the propagator 159 through the probability network 642, classifying the unlabeled feature points. The propagator 159 proceeds as follows: If the identity of the $i^{th}$ person is known to be individual of interest q with probability p, then that belief is propagated through the probability network 642 according to the weights $w_{ij}$. The $j^{th}$ feature point then has belief of $pw_{ij}$ that its identity is q. In turn, this belief can be propagated to its neighbors by multiplying by the appropriate weights. When multiple beliefs associated with a single individual arrive at a single point, only the maximum value belief is preserved. There exist many processes for propagating beliefs on a network, and many of these variations can be used. For example, Markov random fields can be used.

FIG. 14 shows an example of the propagation of beliefs across the probability network 642. The star shows a point with an assigned label (i.e. 100% likelihood that the identity of that person is $q_1$.) The probability network 642 then shows all the points (29 triangles and 1 square) that end up with a probability of being individual $q_1$ with >50% likelihood. Of these, the triangles indicate all the points which are actually individual $q_1$, and the square indicates a point that is not individual $q_1$. When determining the likelihoods that a particular detected unique object from an image or video has a certain identity, it can be useful to consider the features of other detected unique objects in the same image or video. This is useful because, for example, a given person (Ethan Gallagher) can appear only once in a particular image under normal circumstances (i.e. excluding mirrors, or pictures of pictures, etc.) above-cited commonly assigned U.S. patent application Ser. No. 11/342,053 describes a classification system to properly handle this problem. The classification system detects objects, then analyzes the features of the detected objects and compares them to a set of labeled detected objects to establish initial likelihoods. These initial likelihoods are analyzed by a multiple object resolver to produce final likelihoods, indicating potential identities for detected objects and the associated probabilities. Additionally, the final likelihoods can be the likelihood that a particular object appears within an image or video (without necessarily indicating which detected unique object 157 is believed to be the particular object).

Figure 15:
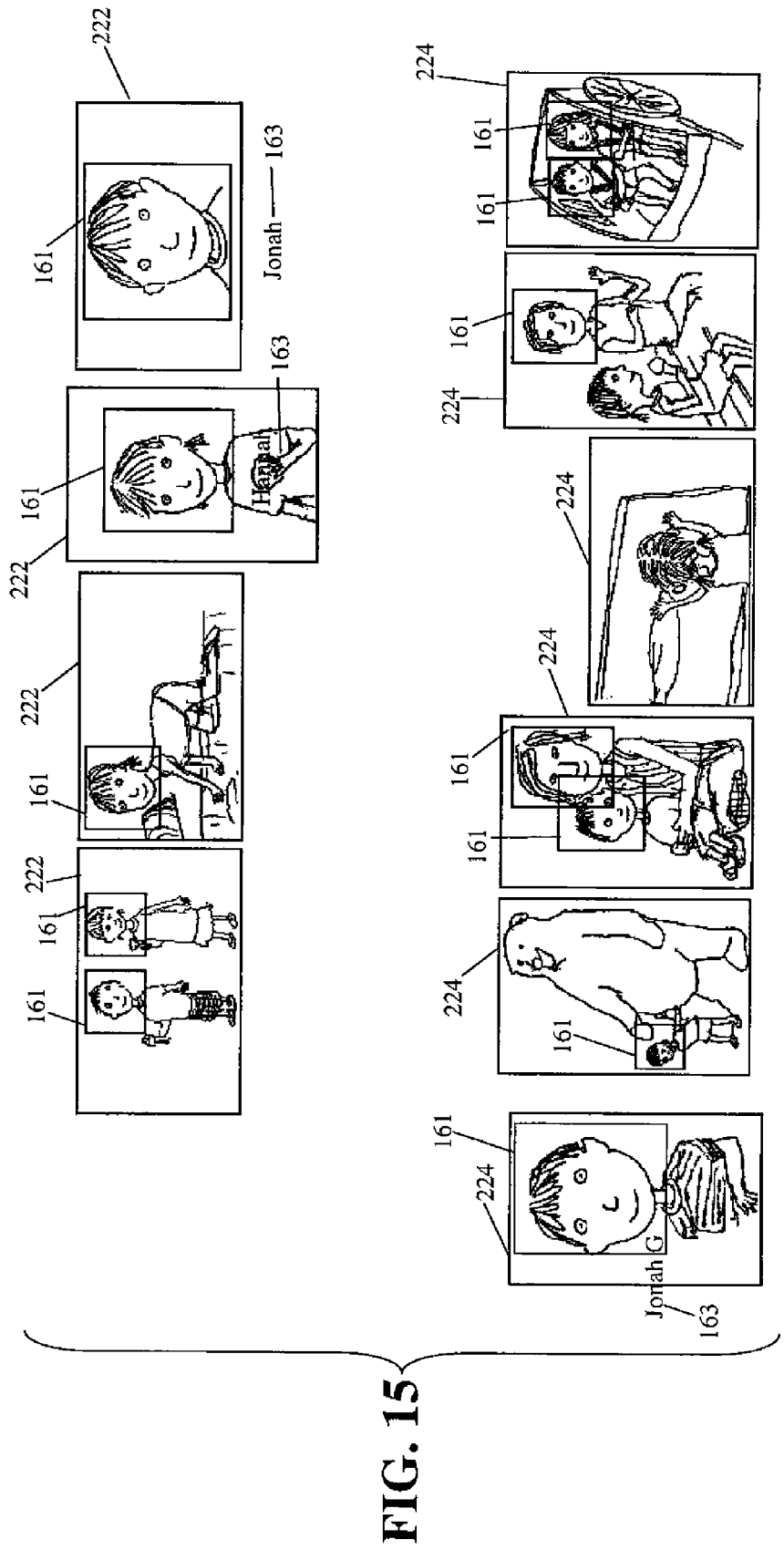
FIG. 15 shows example images, detected unique objects, and labels, from two example image collections.

FIG. 15 shows a further example of the inventive system. Images from two image collections 102 are shown. Four images from image collection A 222 and six images from image collection B 224 are shown. Assume that collection A and collection B are mutually linked. Boxes 161 indicate the locations of faces found when the unique object extractor 119 of FIG. 7 is a face detector, and the unique objects 157 are detected faces. Suppose that certain unique objects 157 are labeled by the collection users with labels 163. In the example in image collection 102 A, two unique objects 157 (faces) are labeled with labels 163 indicating the names of the individuals (Hannah and Jonah). And in image collection B, one face is labeled with a label 163 indicating the name of the individual (Jonah G). The unique object comparator 121 and distinct object finder 141 of FIG. 7 determine as described above that $Jonah_A$ is the same individual as $Jonah\ G_B$. The list of distinct unique objects 133 is:

$O_1$: $Hannah_A$
$O_2$: $Jonah_A$=$Jonah\ G_B$

A classifier 135 is formed using all the labeled examples from the linked image collections 102. Then the unlabeled detected unique objects 157 (i.e. the detected faces indicated by boxes 161) are evaluated by the classifier 135 to identify the unlabeled detected unique objects 157.

Figure 16:
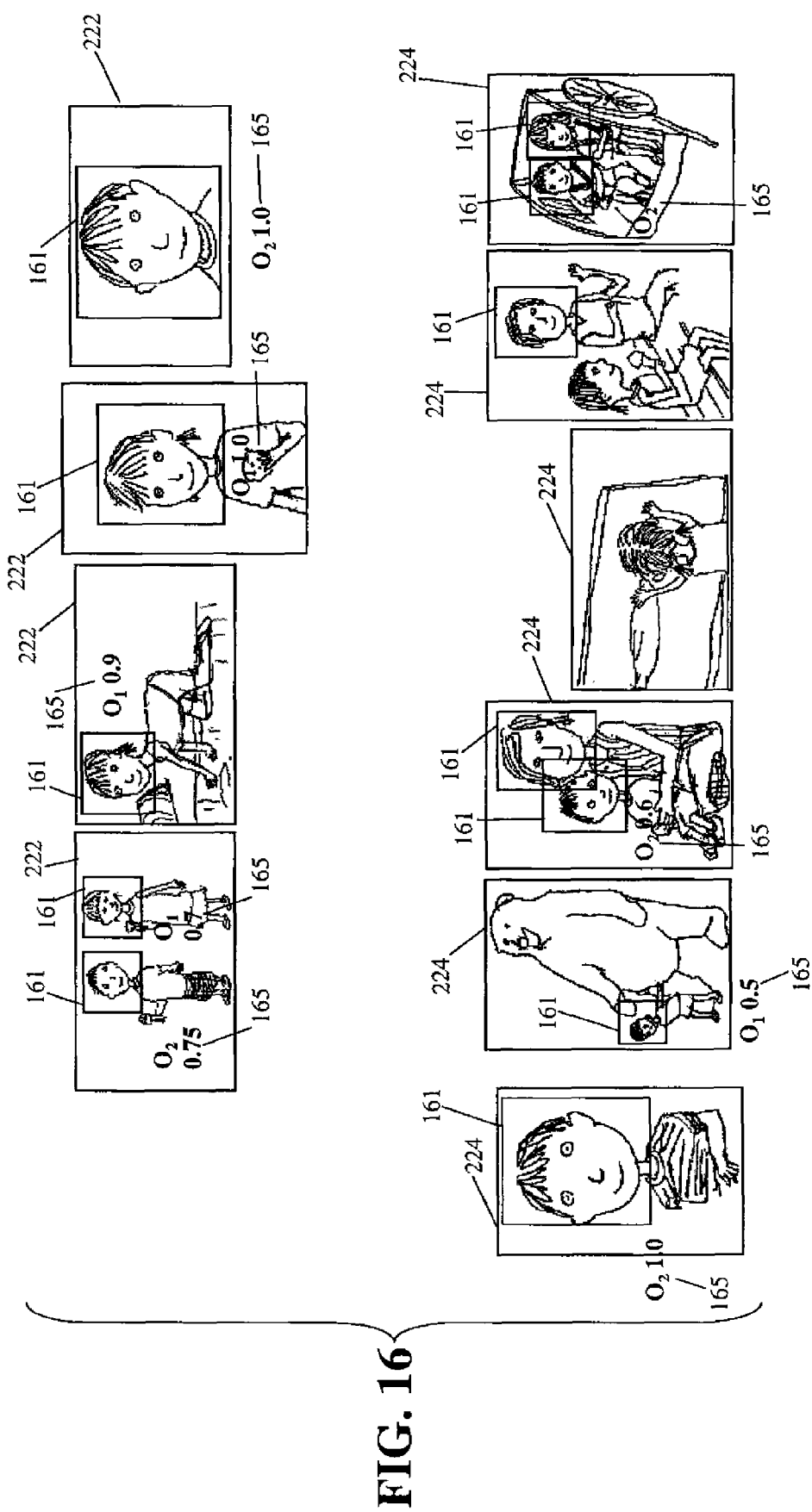
FIG. 16 illustrates the output of the classifier from FIG. 7 with the example image collections.

FIG. 16 shows an example of the output of the classifier 135. In this example, the classifier indicates the most likely identity of each detected unique object 157. Alternatively, the classifier can also indicate the likelihood that a particular image or video contains a particular object of interest (e.g. a person). For many of the detected objects, the classifier 135 determines a label 165 for the detected object. The label 165 indicates the likely identity of the unique object 157 as well as the likelihood. For example, for the first image 222 from image collection 102 A, the classifier 135 determines the unique object on the left is $O_2$ ($Jonah_A$=$Jonah\ G_B$) with a probability or belief of 0.75, and the other unique object is $O_1$ (Hannah) with belief of 0.7.

Figure 17:
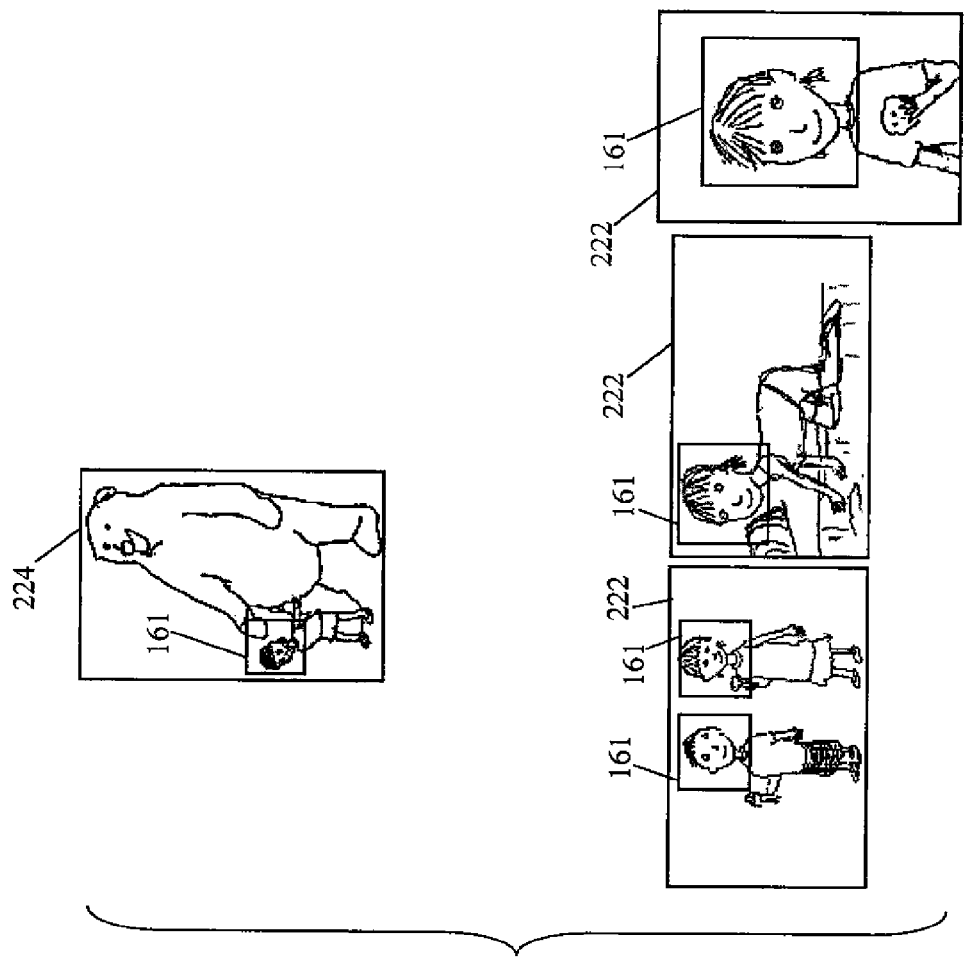
FIG. 17 illustrates the image search results obtained from the example image collections.

When either of the collection users searches for images and videos with a query list of objects 151, the image selector 153 returns image search results 155 that can be viewed on the display 143. For example, the user of image collection 102 B searches for images containing Hannah. The image selector recognizes this search is for images containing distinct object $O_1$. The image search results 155 are shown in FIG. 17 and include an image 224 from her collection and three images 222 from linked image collection 102 A. The image search results 155 can show a set of images sorted by likelihood that they satisfy the query. Alternatively the image search results 155 can be compartmentalized by the image collection 102 that they are from. In this case, images satisfying the query from the user's own collection are ranked ahead of other images.

Note that the user of image collection 102 B was able to search for images containing Hannah although she herself did not label any images as containing Hannah. The classifier 135 uses all labeled examples from the image collection of the user and linked image collections to identify and label unique objects.

Figure 19:
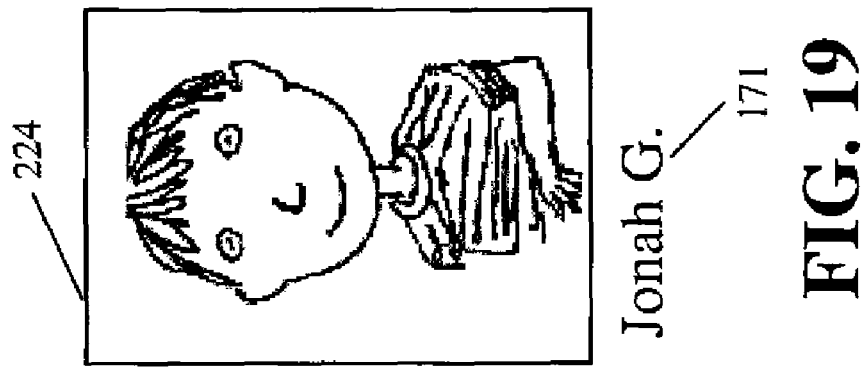
FIGS. 18 and 19 show example images from an image collection and labels as they appear to distinct users.
Figure 18:
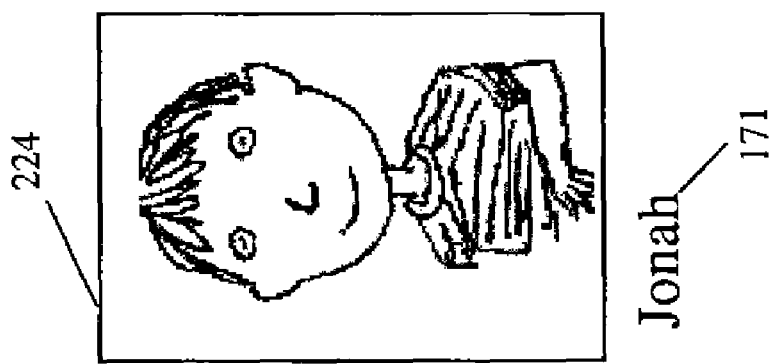

Images can be displayed on the display 143 with labels determined by the classifier 135. The label associated with a distinct unique object can have several variations. When multiple variations exist, the variation of the label that is selected can depend on the identity of the user who accesses the image. For example FIGS. 18 and 19 show an image 224 from image collection B. When the user of image collection A views the image on the display 143, she sees the label 171 "Jonah". When the user of image collection B views the image on the display 143, she sees the label 171 "Jonah G".

A user can produce an image product 602 from the image search results 155. The image product 602 is a product that uses at least one image or video from a digital image collection 102 in its creation. Examples of image products 602 include:

framed photographs. Framed photographs contain windows for viewing one or more photographs (i.e. printed images.) Also, digital frames contain a screen capable of displaying multiple images at a given time, or multiple images by cycling through a set of images over time.

photo calendar. Calendars typically contain an area to display an image for each month or week included in the span of the calendar. A calendar can be printed on paper, or be contained in computer memory and viewed via a display such as an LCD display.

album. A photo album typically contains multiple pages and each page con show one or more images. As with a calendar, an album can be printed or viewed via a display.

slide show. A slide show (i.e. a series of images that is displayed sequentially) can be stored in memory, or saved to media such as a DVD.

web page. A web page can contain a set of images including thumbnail images that, when clicked by a mouse or otherwise selected by a user, display a larger version of the image.

Other image products 602 include mugs, t-shirts, mouse pads, puzzles, etc. upon which images are printed.

Those skilled in the art will recognize that many variations can be made to the description of the present invention without significantly deviating from the scope of the present invention.

PARTS LIST 100 communication network
102 image collection
103 collection information
105 collection of links
107 step
109 step
111 step
113 collection comparator
114 database
115 similarity matrix
117 linker
119 unique object extractor
120 labeler
121 unique object comparator
123 similarity determiner
125 metadata analyzer
127 name table
129 link
133 distinct unique objects
135 classifier
141 distinct object finder
143 display
145 user input
151 query list of objects
153 image selector
155 image search results
157 unique objects
159 propagator
161 box
163 label
165 label
171 label
222 image from image collection A
224 image from image collection B
240 local feature detector
242 global feature detector
244 local features
246 global features
251 image portion
253 image portion
255 image portion
602 image product
640 probability network former
642 probability network
802 collection networker

The invention claimed is:

1. A method of identifying images having a particular person found in at least two separate collections of different users by using a communications network, the method comprising:
   a) identifying the particular person that is labeled with a name in a first collection and providing features for the particular person;
   b) identifying a second separate image collection produced by a different user that potentially has images of the particular person and authorizing the collection to be available for searching;
   c) identifying features and names corresponding to faces in images from the second collection;
   d) using the features and the name from the first collection and features and names from the second collection to produce a probability that images from the second collection contains the particular person and using the probability to identify images containing the particular person by searching the second collection, wherein the particular person is labeled in the second collection with a different name and wherein either the name in the first collection or the name in the second collection is a social relationship; and
   e) providing identified images in the second collection on a display for viewing by a user to determine if they contain the particular person.

2. The method of claim 1 wherein the features include facial features, image capture location features or image capture time features.

3. A method of identifying images having a particular person found in at least two separate collections of different users by using a communications network, the method comprising:
   a) identifying the particular person that is labeled with a name in a first collection and providing features for the particular person;
   b) identifying a second separate image collection produced by a different user that potentially has images of the particular person and authorizing the collection to be available for searching;
   c) identifying features and names corresponding to faces in images from the second collection;
   d) using the features and a gender associated with the name from the first collection and features and genders associated with the names from the second collection to produce a probability that images from the second collection contains the particular person and using the probability to identify images containing the particular person by searching the second collection, wherein the particular person is labeled in the second collection with a different name; and
   e) providing identified images in the second collection on a display for viewing by a user to determine if they contain the particular person.

* * * * *